US006970787B2

(12) United States Patent
Matsumoto et al.

(10) Patent No.: US 6,970,787 B2
(45) Date of Patent: Nov. 29, 2005

(54) AUTOMOTIVE LANE DEVIATION AVOIDANCE SYSTEM

(75) Inventors: Shinji Matsumoto, Kanagawa (JP); Genpei Naito, Yokohama (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 106 days.

(21) Appl. No.: 10/693,946

(22) Filed: Oct. 28, 2003

(65) Prior Publication Data

US 2004/0098197 A1 May 20, 2004

(30) Foreign Application Priority Data

Nov. 20, 2002 (JP) .............................. 2002-336634

(51) Int. Cl.⁷ .......................... G06F 17/10; B60K 31/00
(52) U.S. Cl. ...................... 701/301; 701/302; 701/96; 180/168; 180/170; 340/425.5
(58) Field of Search ........................... 701/1, 45, 301, 701/302, 41, 96; 340/425.5, 436, 435, 438; 180/168, 170

(56) References Cited

U.S. PATENT DOCUMENTS

| | | | |
|---|---|---|---|
| 6,493,619 B2 * | 12/2002 | Kawazoe et al. .............. 701/41 |
| 6,580,986 B1 * | 6/2003 | Uenuma et al. ............... 701/41 |
| 2003/0195667 A1 * | 10/2003 | Tange et al. ..................... 701/1 |
| 2004/0102884 A1 | 5/2004 | Tange et al. |
| 2004/0107035 A1 | 6/2004 | Tange et al. |
| 2004/0158377 A1 * | 8/2004 | Matsumoto et al. ........... 701/48 |
| 2004/0186650 A1 * | 9/2004 | Tange et al. ................... 701/96 |
| 2004/0215393 A1 * | 10/2004 | Matsumoto et al. ......... 701/300 |
| 2004/0230375 A1 * | 11/2004 | Matsumoto et al. ......... 701/301 |

FOREIGN PATENT DOCUMENTS

| | | |
|---|---|---|
| JP | 9-142327 A | 6/1997 |
| JP | 11-096497 A | 4/1999 |
| JP | 2000-25631 A | 1/2000 |
| JP | 2001-310719 A | 11/2001 |
| JP | 2002-032125 A | 1/2002 |
| JP | 2002-123898 A | 4/2002 |

OTHER PUBLICATIONS

U.S. Appl. No. 10/825,108, filed Apr. 16, 2004, Matsumoto et al.
U.S. Appl. No. 10/828,462, filed Apr. 21, 2004, Matsumoto et al.

* cited by examiner

*Primary Examiner*—Yonel Beaulieu
(74) *Attorney, Agent, or Firm*—Foley & Lardner LLP

(57) ABSTRACT

In an automotive lane deviation avoidance system that prevents a host vehicle from deviating from its driving lane by correcting the host vehicle's course in a direction that avoids the host vehicle's lane deviation in the presence of a possibility of the host vehicle's lane deviation, the system calculates a desired yawing moment needed to avoid the host vehicle's lane deviation from the driving lane. The system compensates for the desired yawing moment by a correction factor or a gain, which is determined based on a throttle opening of the host vehicle.

22 Claims, 9 Drawing Sheets

AUTOMOTIVE LANE DEVIATION AVOIDANCE SYSTEM

TECHNICAL FIELD

The present invention relates to an automotive lane deviation avoidance system for an adaptive vehicle speed control system equipped vehicle or an adaptive cruise control system equipped vehicle or an active cruise control (ACC) system equipped vehicle, and particularly to the improvement of techniques for preventing an ACC vehicle (a host vehicle) from deviating from the driving lane by correcting the host vehicle's course in a direction that the lane deviation is avoided when there is a possibility of the host vehicle's lane deviation.

BACKGROUND ART

In recent years, there have been proposed and developed various automotive lane deviation avoidance technologies. An automotive lane deviation avoidance system, capable of executing a lane deviation avoidance control function that corrects the host vehicle's course in the direction of lane deviation avoidance, has been disclosed in Japanese Patent Provisional Publication No. 9-142327 (hereinafter is referred to as "JP9-142327"). In the lane deviation preventing device disclosed in JP9-142327, an electronic control unit (ECU) determines that a steering operation is made with a driver's intention for lane changing or collision avoidance with the frontally-located object when at least one of a steering velocity, a steering torque, and a time rate of change in steering torque becomes greater than or equal to a threshold value. When the ECU determines the presence of the driver's intention for lane changing or collision avoidance, the ECU disables or disengages or regulates operations of actuators used for lane deviation avoidance control, for example, brake actuators, a steering actuator, a throttle actuator, and an alarm actuator so as to avoid an undesirable control interference between lane deviation avoidance control and actions taken manually by the driver or an undesirable control interference between lane deviation avoidance control and vehicle dynamics control that reduces a turning level to achieve a transition from an unstable driving state (a poor driving stability) approximate to the vehicle's limit drivability to a stable driving state (a good driving stability).

SUMMARY OF THE INVENTION

However, as discussed above, the lane deviation preventing device disclosed in JP9-142327 determines the presence or absence of the driver's intention for lane changing or collision avoidance with the frontally-located obstacle, based on at least one of a steering velocity, a steering torque, and a time rate of change in steering torque. Therefore, in case of a very moderate steering action taken by the driver with a steering velocity less than a predetermined steering-velocity threshold during lane-changing or during collision avoidance, or in presence of application of steering torque whose magnitude is above a predetermined steering-torque threshold owing to inattentive driving or disturbance inputted from roads, or when a time rate of change in steering torque exceeds its threshold owing to disturbance inputted from roads, there is a drawback that the lane deviation avoidance control function is engaged (enabled) or disengaged (disabled) against the driver's intention. For the reasons discussed above, it is desirable to more precisely determine the presence or absence of a driver's intention for lane deviation (lane-changing) when an ECU determines that there is a possibility of host vehicle's lane deviation, and also to more precisely correct a host vehicle's course in a direction that the lane deviation is avoided.

Accordingly, it is an object of the invention to provide an automotive lane deviation avoidance system, capable of more precisely determining the presence or absence of a driver's intention for lane deviation (lane-changing) when an ECU determines that there is a possibility of host vehicle's lane deviation, and capable of more precisely correcting a host vehicle's course in a direction that the lane deviation is avoided.

In order to accomplish the aforementioned and other objects of the present invention, an automotive lane deviation avoidance system comprises a control unit that executes a host vehicle's lane deviation control that a change in vehicle dynamic behavior occurs in a direction that avoids a host vehicle from deviating from a driving lane when there is a possibility of the host vehicle's lane deviation from the driving lane, and the control unit comprising a lane-deviation decision section that determines the presence or absence of the possibility of the host vehicle's lane deviation from the driving lane, and a lane-deviation avoidance section that prevents the host vehicle from deviating from the driving lane by correcting the host vehicle's course in the direction that avoids the host vehicle's lane deviation in the presence of the possibility of the host vehicle's lane deviation from the driving lane, the lane-deviation avoidance section calculating a host vehicle's course correction value needed to avoid the host vehicle's lane deviation from the driving lane and additionally compensating for the host vehicle's course correction value based on a throttle opening of the host vehicle.

According to another aspect of the invention, an automotive lane deviation avoidance system comprises a control unit that executes a host vehicle's lane deviation control that a change in vehicle dynamic behavior occurs in a direction that avoids a host vehicle from deviating from a driving lane when there is a possibility of the host vehicle's lane deviation from the driving lane, and the control unit comprising a lane-deviation decision section that determines the presence or absence of the possibility of the host vehicle's lane deviation from the driving lane, a lane-deviation avoidance section that prevents the host vehicle from deviating from the driving lane by correcting the host vehicle's course in the direction that avoids the host vehicle's lane deviation in the presence of the possibility of the host vehicle's lane deviation from the driving lane, and a throttle opening detection section that detects a throttle opening, the lane-deviation avoidance section comprising a host vehicle's course correction value calculation section that calculates a host vehicle's course correction value needed to avoid the host vehicle's lane deviation from the driving lane, a host vehicle's course correction value compensation section that compensates for the host vehicle's course correction value based on the throttle opening, and a host vehicle's course correction section that corrects the host vehicle's course in the direction that avoids the host vehicle's lane deviation, depending on the host vehicle's course correction value compensated for based on the throttle opening.

According to a further aspect of the invention, an automotive lane deviation avoidance system comprises a control unit that executes a host vehicle's lane deviation control that a change in vehicle dynamic behavior occurs in a direction that avoids the host vehicle from deviating from a driving lane when there is a possibility of the host vehicle's lane deviation from the driving lane, and the control unit comprising a lane-deviation decision means for determining the presence or absence of the possibility of the host vehicle's lane deviation from the driving lane, and a lane-deviation avoidance means for preventing the host vehicle from deviating from the driving lane by correcting the host vehicle's course in the direction that avoids the host vehicle's lane deviation in the presence of the possibility of the host vehicle's lane deviation from the driving lane, and for calculating a host vehicle's course correction value needed to avoid the host vehicle's lane deviation from the driving lane, and for compensating for the host vehicle's course correction value based on a throttle opening of the host vehicle.

According to another aspect of the invention, an automotive lane deviation avoidance system comprises a control unit that executes a host vehicle's lane deviation control that a change in vehicle dynamic behavior occurs in a direction that avoids the host vehicle from deviating from a driving lane when there is a possibility of the host vehicle's lane deviation from the driving lane, and the control unit comprising a lane-deviation decision means for determining the presence or absence of the possibility of the host vehicle's lane deviation from the driving lane, a lane-deviation avoidance means for preventing the host vehicle from deviating from the driving lane by correcting the host vehicle's course in the direction that avoids the host vehicle's lane deviation in the presence of the possibility of the host vehicle's lane deviation from the driving lane, and a throttle opening detection means for detecting a throttle opening, the lane-deviation avoidance means comprising a host vehicle's course correction value calculation means for calculating a host vehicle's course correction value needed to avoid the host vehicle's lane deviation from the driving lane, a host vehicle's course correction value compensation means for compensating for the host vehicle's course correction value based on the throttle opening, and a host vehicle's course correction means for correcting the host vehicle's course in the direction that avoids the host vehicle's lane deviation, depending on the host vehicle's course correction value compensated for based on the throttle opening.

According to another aspect of the invention, a method of avoiding an adaptive cruise control system equipped vehicle from deviating from a driving lane, the method comprises determining the presence or absence of a driver's intention for lane changing, determining the presence or absence of a possibility that a host vehicle from deviating from a driving lane without the driver's intention for lane changing, calculating a host vehicle's course correction value needed to avoid the host vehicle's lane deviation from the driving lane, compensating for the host vehicle's course correction value based on a throttle opening of the host vehicle, and avoiding the host vehicle's lane deviation from the driving lane by correcting the host vehicle's course by the host vehicle's course correction value compensated for based on the throttle opening in the presence of the possibility of the host vehicle's lane deviation from the driving lane without the driver's intention for lane changing.

According to a further aspect of the invention, a method of avoiding an adaptive cruise control system equipped vehicle from deviating from a driving lane, the adaptive cruise control system equipped vehicle employing a braking-force and driving-force control system that produces a yawing moment, acting in a direction that avoids a host vehicle from deviating from the driving lane when there is a possibility of the host vehicle's lane deviation from the driving lane, by controlling at least one of a braking force and a driving force applied to each of road wheels of the host vehicle, the method comprises determining the presence or absence of a driver's intention for lane changing, determining the presence or absence of the possibility of the host vehicle's lane deviation from the driving lane without the driver's intention for lane changing, calculating a desired yawing moment needed to avoid the host vehicle's lane deviation from the driving lane, compensating for the desired yawing moment based on a throttle opening of the host vehicle to derive a final desired yawing moment decreasingly compensated for by a throttle-opening dependent gain, and avoiding the host vehicle's lane deviation from the driving lane by correcting the host vehicle's course by the final desired yawing moment in the presence of the possibility of the host vehicle's lane deviation from the driving lane without the driver's intention for lane changing.

According to a still further aspect of the invention, a method of avoiding an adaptive cruise control system equipped vehicle from deviating from a driving lane, the adaptive cruise control system equipped vehicle employing a steering control system that produces a steering torque, acting in a direction that avoids a host vehicle from deviating from the driving lane when there is a possibility of the host vehicle's lane deviation from the driving lane, by controlling the steering torque applied to a steering system, the method comprises determining the presence or absence of a driver's intention for lane changing, determining the presence or absence of the possibility of the host vehicle's lane deviation from the driving lane without the driver's intention for lane changing, calculating a desired steering torque needed to avoid the host vehicle's lane deviation from the driving lane, compensating for the desired steering torque based on a throttle opening of the host vehicle to derive a final desired steering torque decreasingly compensated for by a throttle-opening dependent gain, and avoiding the host vehicle's lane deviation from the driving lane by correcting the host vehicle's course by the final desired steering torque in the presence of the possibility of the host vehicle's lane deviation from the driving lane without the driver's intention for lane changing.

The other objects and features of this invention will become understood from the following description with reference to the accompanying drawings.

DESCRIPTION OF THE PREFERRED EMBODIMENTS

Figure 1:
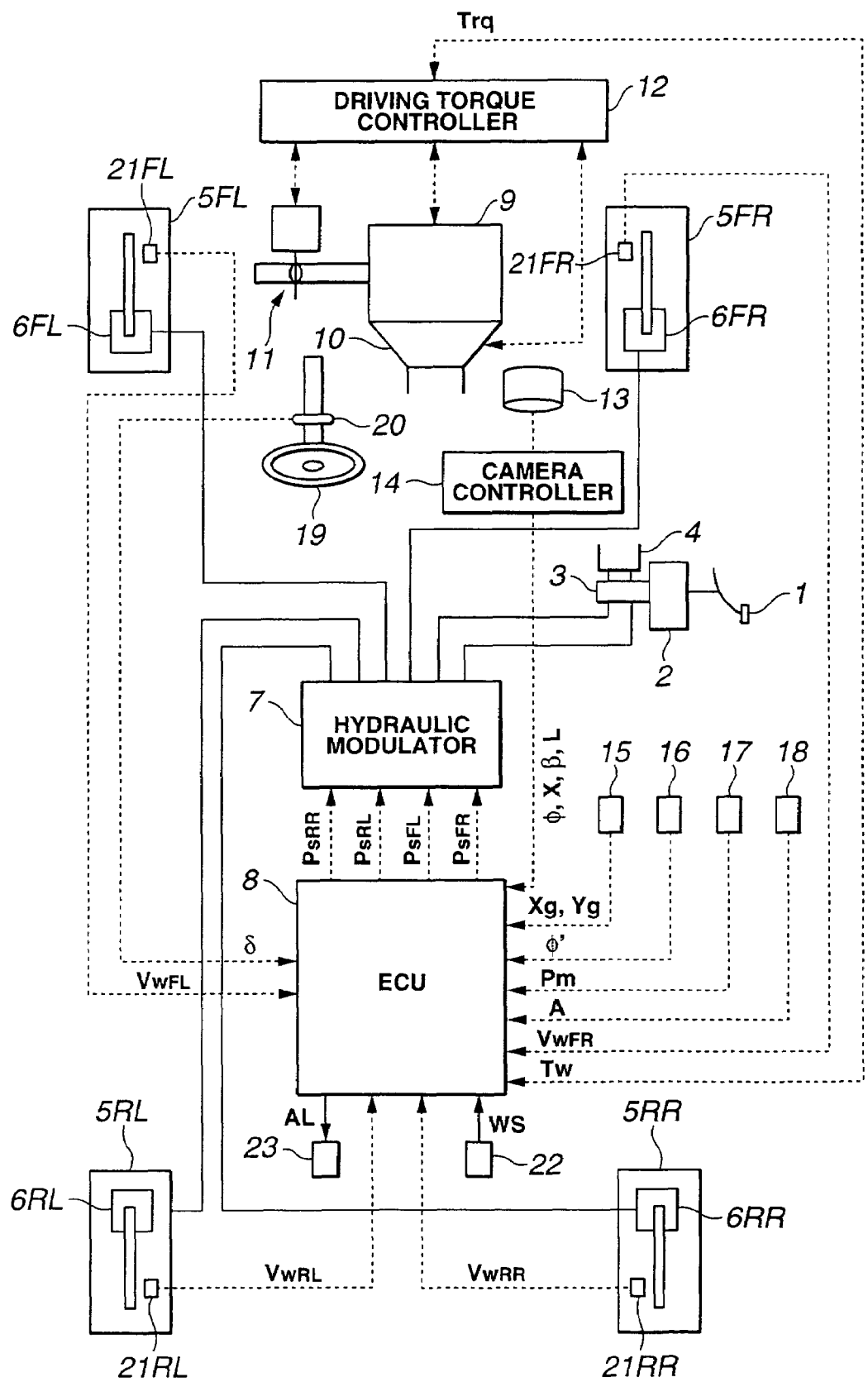
FIG. 1 is a system block diagram illustrating a first embodiment of an automotive lane deviation avoidance system.

Referring now to the drawings, particularly to FIG. 1, the lane deviation avoidance system of the first embodiment is exemplified in an automotive lane deviation avoidance system equipped rear-wheel-drive vehicle employing an automatic transmission 10 and a rear differential. In the first embodiment of FIG. 1, as a braking force control system that regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from an electronic control unit (ECU) 8, for regulating the wheel-cylinder pressure of each of wheel-brake cylinders 6FL-6RR in response to the command signal value from ECU 8.

The automotive lane deviation avoidance system equipped rear-wheel-drive vehicle of the first embodiment of FIG. 1 also includes an electronic driving torque controller 12 that controls a driving torque transmitted to rear road wheels 5RL and 5RR serving as drive wheels, by controlling an operating condition of an engine 9, a selected transmission ratio of automatic transmission 10, and/or a throttle opening A of a throttle valve 11. Concretely, the operating condition of engine 9 can be controlled by controlling the amount of fuel injected or an ignition timing. Also, the engine operating condition can be controlled by the throttle opening control. Driving torque controller 12 is designed to individually control the driving torque transmitted to rear road wheels 5RL and 5RR (drive wheels). Additionally, driving torque controller 12 is responsive to a driving-torque command signal from ECU 8 in a manner so as to control the driving torque depending on the driving-torque command signal value.

The automotive lane deviation avoidance system equipped rear-wheel-drive vehicle of the first embodiment of FIG. 1 also includes a stereocamera with a charge-coupled device (CCD) image sensor, simply, a charge-coupled device (CCD) camera 13 and a camera controller 14 as an external recognizing sensor, which functions to detect a position of the lane deviation avoidance system equipped vehicle (the host vehicle) within the driving lane (the host vehicle's traffic lane) and whose sensor signal is used for the lane deviation avoidance control. Within camera controller 14, on the basis of an image-processing image data in front of the host vehicle and captured by CCD camera 13, a lane marker or lane marking, such as a white line, is detected and thus the current host vehicle's traffic lane, in other words, the current position of the host vehicle within the host vehicle's lane, is detected. Additionally, the processor of camera controller 14 calculates or estimates, based on the image data from CCD camera 13 indicative of the picture image, a host vehicle's yaw angle φ with respect to the direction of the current driving lane (the host vehicle's lane), a host vehicle's lateral displacement or a host vehicle's lateral deviation X from a central axis of the current host vehicle's driving lane, a curvature β of the current host vehicle's driving lane, and a lane width L of the current driving lane. When the lane marker or lane marking, such as a white line, in front of the host vehicle, has worn away or when the lane markers or lane markings are partly covered by snow, it is impossible to precisely certainly recognize the lane markers or lane markings. In such a case, each of detection parameters, that is, the host vehicle's yaw angle φ, lateral deviation X, curvature β, and lane width L is set to "0". In contrast, in presence of a transition from a while-line recognition enabling state that the lane marking, such as a white line, can be recognized continually precisely to a while-line recognition partly disabling state that the lane marking, such as a while line, cannot be recognized for a brief moment, owing to noise or a frontally-located obstacle, parameters φ, X, β, and L are held at their previous values $\phi_{(n-1)}$, $X_{(n-1)}$, $\beta_{(n-1)}$, and $L_{(n-1)}$ calculated by camera controller 14 one cycle before.

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters φ, X, β, and L calculated by camera controller 14, and the signal indicative of a driving torque Tw, controlled and produced by driving-torque controller 12, the input/output interface (I/O) of ECU 8 receives input information from various engine/vehicle switches and sensors, such as an acceleration sensor 15, a yaw rate sensor 16, a master-cylinder pressure sensor 17, a throttle opening sensor 18, a steer angle sensor 20, front-left, front-right, rear-left, and rear-right wheel speed sensors 21FL, 21FR, 21RL, and 21RR, and a direction indicator switch 22. As seen from the system block diagram of FIG. 1, for mutual communication via a data link, ECU 8 is electrically connected to driving torque controller 12. Acceleration sensor 15 is provided to detect a longitudinal acceleration Xg and a lateral acceleration Yg, exerted on the host vehicle. Yaw rate sensor 16 is provided to detect a yaw rate φ' resulting from a yawing moment acting on the host vehicle. Master-cylinder pressure sensor 17 is provided to detect a master-cylinder pressure Pm of master cylinder 3, that is, the amount of depression of brake pedal 1. Throttle opening sensor 18 is provided to detect a throttle opening A, which is dependent on a manipulated variable of the driver's accelerator-pedal depression. Steer angle sensor 20 is provided to detect a steer angle δ of a steering wheel 19. Front-left, front-right, rear-left, and rear-right wheel speed sensors 21FL, 21FR, 21RL, and 21RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 22 is provided to detect whether a direction indicator is turned on and also detects the direction indicated by the direction indicator, and to output a direction indicator switch signal WS. In the presence of a directionality or polarity concerning left or right directions of each of the vehicle running state indicative data, yaw rate φ', lateral acceleration Yg, steer angle δ, yaw angle φ, and lateral deviation X, a change in the vehicle running state indicative data to the left is indicated as a positive value, while a change in the vehicle running state indicative data to the right is indicated as a negative value. More concretely, during a left turn, yaw rate φ', lateral acceleration Yg, steer angle δ, and yaw angle φ are all indicated as positive values. Conversely during a right turn, these parameters φ', Yg, δ, and φ are all indicated as negative values. On the other hand, lateral deviation X is indicated as a positive value when the host vehicle is deviated from the central axis of the current host vehicle's driving lane to the left. Conversely when the host vehicle is deviated from the central axis of the current host vehicle's driving lane to the right, lateral deviation X is indicated as a negative value. The positive signal value of direction indicator switch signal WS from direction indicator switch 22 means a left turn (counterclockwise rotation of direction indicator switch 22), whereas the negative signal value of direction indicator switch signal WS from direction indicator switch 22 means a right turn (clockwise rotation of direction indicator switch 22). ECU 8 is also connected to a warning system 23 having a warning buzzer and/or a warning light, which comes on in response to an alarm signal AL from ECU 8. Within ECU 8, the central processing unit (CPU) allows the access by the I/O interface of input informational data signals from the previously-discussed engine/vehicle switches and sensors and camera controller 14 and driving torque controller 12, and is responsible for carrying various control programs stored in the memories and capable of performing necessary arithmetic and logic operations. Computational results or arithmetic calculation results, in other words, calculated output signals or control command signals are relayed via the output interface circuitry to the output stages, for example, the solenoids of hydraulic modulator 7 and the warning buzzer/warning light of warning system 23.

Figure 2:
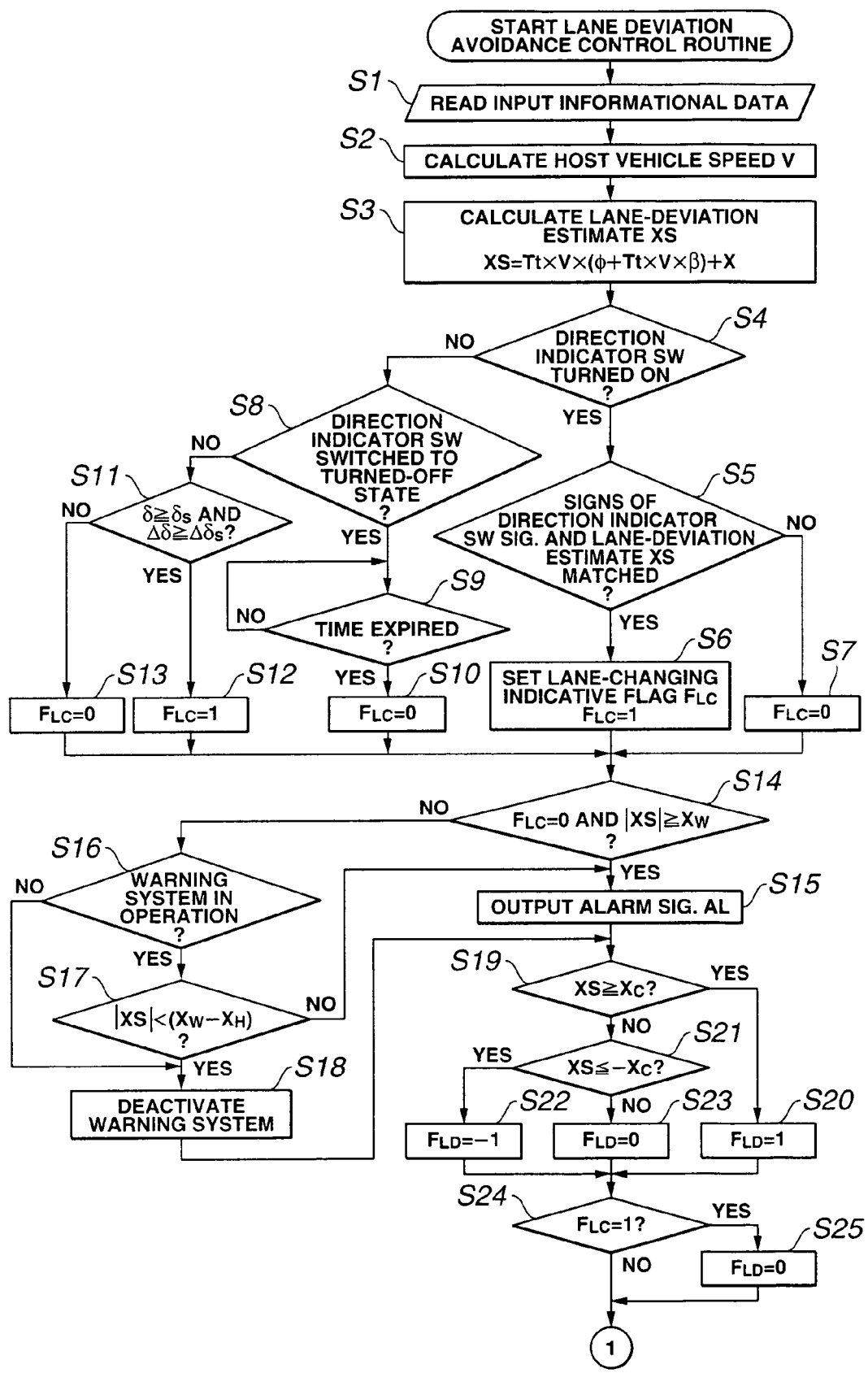
FIG. 2 is a flow chart showing the first half of a lane deviation avoidance control routine executed by the system of the first embodiment of FIG. 1.
Figure 3:
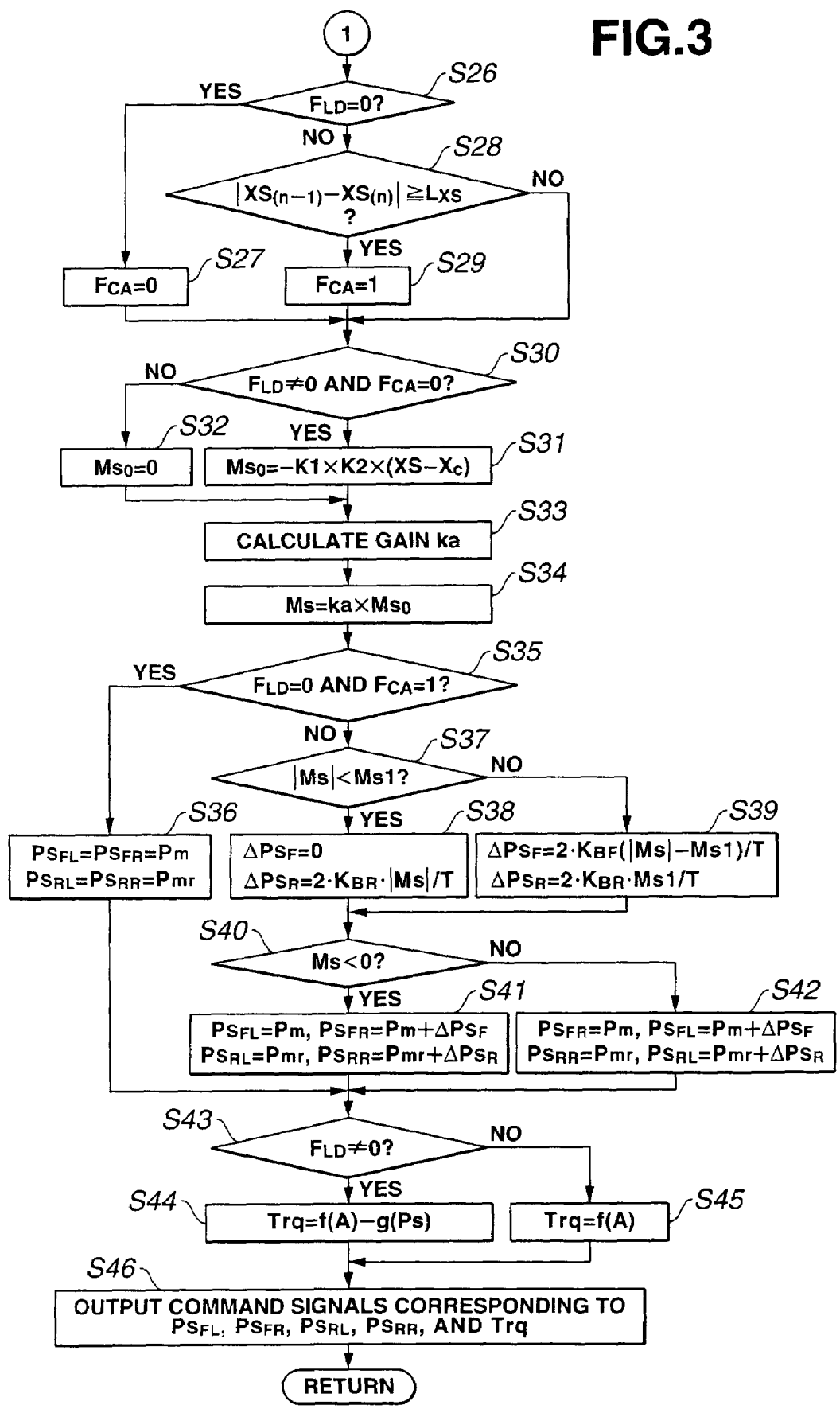
FIG. 3 is a flow chart showing the second half of the lane deviation avoidance control routine executed by the system of the first embodiment of FIG. 1.

The lane deviation avoidance control routine executed by ECU 8 is hereunder described in detail in reference to the flow charts shown in FIGS. 2 and 3. The lane deviation avoidance control routine of FIG. 2 (the former half) and 3 (the latter half) is executed as time-triggered interrupt routines to be triggered every predetermined sampling time intervals such as 10 milliseconds.

At step S1, input informational data from the previously-noted engine/vehicle switches and sensors, and driving-torque controller 12 and camera controller 14 are read. Concretely, engine/vehicle switch/sensor signal data, such as the host vehicle's longitudinal acceleration Xg, lateral acceleration Yg, yaw rate φ', wheel speeds Vwi ($Vw_{FL}$, $Vw_{FR}$, $Vw_{RL}$, $Vw_{RR}$), throttle opening A, master-cylinder pressure Pm, steer angle δ, and direction indicator switch signal WS, and the signal data from driving-torque controller 12 such as driving torque Tw, and the signal data from camera controller 14 such as the host vehicle's yaw angle φ with respect to the direction of the current host vehicle's driving lane, lateral deviation X from the central axis of the current host vehicle's driving lane, curvature β of the current driving lane, and lane width L of the current driving lane.

At step S2, a host vehicle's speed V is calculated as a simple average value (($Vw_{FL}$+$Vw_{FR}$)/2) of front-left and front-right wheel speeds $Vw_{FL}$ and $Vw_{FR}$ (corresponding to wheels speeds of driven road wheels 5FL and 5FR), from the expression V=($Vw_{FL}$+$Vw_{FR}$)/2.

At step S3, a lane-deviation estimate XS, in other words, an estimate of a future lateral deviation, is estimated or arithmetically calculated based on the latest up-to-date information concerning the host vehicle's yaw angle φ with respect to the direction of the current host vehicle's driving lane, lateral deviation X from the central axis of the current host vehicle's driving lane, curvature β of the current host vehicle's driving lane, and the host vehicle's speed V calculated through step S2, from the following expression (1).

$$XS=Tt \times V \times (\phi+Tt \times V \times \beta)+X \qquad (1)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as an estimate of a future lateral deviation, that is, a lane-deviation estimate XS. In the shown embodiment, ECU 8 determines that there is a possibility or an increased tendency of lane deviation of the host vehicle from the current driving lane, when lane-deviation estimate XS becomes greater than or equal to a predetermined lane-deviation criterion $X_C$, which will be fully described later in reference to steps S14 and S19 of FIG. 2.

At step S4, a check is made to determine whether direction indicator switch 22 is turned on. When the answer to step S4 is in the affirmative (YES), the routine proceeds to step S5.

At step S5, a check is made to determine whether the sign of direction indicator switch signal WS is identical to the sign of lane-deviation estimate XS. When the signs of direction indicator switch signal WS and lane-deviation estimate XS are identical to each other, the processor of ECU 8 determines that the host vehicle is conditioned in the lane changing state and thus step S6 occurs.

At step S6, a lane-changing indicative flag $F_{LC}$ is set to "1". Thereafter, step S14 (described later) occurs.

Conversely when the answer to step S5 is in the negative (NO), that is, the signs of direction indicator switch signal WS and lane-deviation estimate XS are not identical to each other, the processor of ECU 8 determines that the host vehicle is not conditioned in the lane changing state and thus step S7 occurs.

At step S7, lane-changing indicative flag $F_{LC}$ is reset to "0". Thereafter, the routine proceeds from step S7 to step S14 (described later).

On the contrary, when the answer to step S4 is in the negative (NO), that is, direction indicator switch 22 is turned off, the routine proceeds to step S8.

At step S8, a check is made to determine whether direction indicator switch 22 has been switched from the turned-on state to the turned-off state. When the answer to step S8 is in the affirmative (YES), switching from the turned-on state to turned-off state has occurred, ECU determines that the current point of time corresponds to the time just after lane-changing operation, and thus step S9 occurs.

At step S9, a check is made to determine whether a predetermined time interval, such as 4 seconds, measured or counted from the time when switching from the turned-on state of direction indicator switch 22 to turned-off state has occurred, has expired. When the answer to step S9 is in the affirmative (YES), step S10 occurs.

At step S10, lane-changing indicative flag $F_{LC}$ is reset to "0". Thereafter, the routine proceeds from step S10 to step S14 (described later).

Conversely when the answer to step S8 is in the negative (NO), that is, switching from the turned-on state to the turned-off state does not occur, the routine proceeds from step S8 to step S11.

At step S11, a check is made to determine whether steer angle $\delta$ is greater than or equal to a predetermined steer angle $\delta_s$ and additionally a change $\Delta\delta$ in steer angle $\delta$ is greater than or equal to a predetermined change $\Delta\delta_s$. In case of $\delta \geq \delta_s$ and $\Delta\delta \geq \delta_s$, ECU 8 determines that a driver's intention for lane changing is present, and thus the routine proceeds from step S11 to step S12.

At step S12, lane-changing indicative flag $F_{LC}$ is set to "1". Thereafter, the routine proceeds from step S12 to step S14 (described later).

Conversely in case of $\delta < \delta_s$ or $\Delta\delta < \Delta\delta_s$, ECU 8 determines that a driver's intention for lane changing is absent, and thus the routine proceeds from step S11 to step S13.

At step S13, lane-changing indicative flag $F_{LC}$ is reset to "0". Thereafter, the routine proceeds from step S13 to step S14 (described later).

As discussed above, in the shown embodiment, the presence or absence of the driver's intention for lane changing is determined based on both of steer angle $\delta$ and its change $\Delta\delta$. In lieu thereof, the presence or absence of the driver's intention for lane changing may be determined based on the magnitude of steering torque acting on the steering wheel.

At step S14, a check is made to determine whether lane-changing indicative flag $F_{LC}$ is reset to "0" and additionally the absolute value |XS| of lane-deviation estimate XS is greater than or equal to a predetermined alarm criterion threshold value (simply, a predetermined alarm criterion $X_W$). Predetermined alarm criterion $X_W (=X_C-X_M)$ is obtained by subtracting a predetermined margin $X_M$ (a predetermined constant) from predetermined lane-deviation criterion $X_C$. Predetermined lane-deviation criterion $X_C$ means a preset criterion threshold value of lateral displacement of the host vehicle from the central axis of the current host vehicle's driving lane. Predetermined margin $X_M$ corresponds to a margin from a time when warning system 23 has been switched to an operative state to a time when the lane deviation avoidance control function has been engaged or enabled. When the answer to step S14 is in the affirmative (YES), that is, in case of $F_{LC}=0$ and $|XS| \geq X_W$, ECU 8 determines that the host vehicle is in a lane-deviation state where there is an increased tendency for the host vehicle to deviate from the current host vehicle's driving lane, and thus the routine proceeds from step S14 to step S15.

At step S15, the output interface of ECU 8 generates alarm signal AL to warning system 23. Thereafter, step S19 occurs.

Conversely when the answer to step S14 is in the negative (NO), that is, in case of $F_{LC}=1$ or $|XS|<X_W$, ECU 8 determines that the host vehicle is out of the lane-deviation state, and thus the routine proceeds from step S14 to step S16.

At step S16, a check is made to determine whether warning system 23 is in operation. During operation of warning system 23, the routine proceeds from step S16 to step S17.

At step S17, a check is made to determine whether the absolute value |XS| of lane-deviation estimate XS is less than a difference $(X_W-X_H)$ between predetermined alarm criterion $X_W$ and a predetermined hysteresis $X_H$. Predetermined hysteresis $X_H$ is provided to avoid undesirable hunting for warning system 23. When the answer to step S17 is in the affirmative (YES), that is, in case of $|XS|<(X_W-X_H)$, the routine proceeds from step S17 to step S18.

At step S18, warning system 23 is deactivated. That is, the output of alarm signal AL to warning system 23 is stopped. After this, the routine flows from step S18 to step S19.

On the contrary, in case of $|XS| \geq (X_W-X_H)$, the routine proceeds from step S17 to step S15, so as to continually execute the warning operation of warning system 23.

At step S19, a check is made to determine whether lane-deviation estimate XS is greater than or equal to predetermined lane-deviation criterion $X_C$. For instance, predetermined lane-deviation criterion $X_C$ is set to 0.8 meter, since a width of a traffic lane of an express-highway in Japan is 3.35 meters. In case of $XS \geq X_C$, ECU 8 determines that there is an increased tendency for the host vehicle to deviate from the current driving lane to the left, and thus the routine proceeds from step S19 to step S20.

At step S20, a lane-deviation decision flag $F_{LD}$ is set to "1". Thereafter, the routine flows from step S20 via step S24 to step S28 of FIG. 3 described later.

Conversely in case of $XS<X_C$, the routine advances from step S19 to step S21.

At step S21, a check is made to determine whether lane-deviation estimate XS is less than or equal to a negative value $-X_C$ of predetermined lane-deviation criterion $X_C$. In case of $XS \leq -X_C$, ECU 8 determines that there is an increased tendency for the host vehicle to deviate from the current driving lane to the right, and thus the routine proceeds from step S21 to step S22.

At step S22, lane-deviation decision flag $F_{LD}$ is set to "-1". Thereafter, the routine flows from step S22 via step S24 to step S28 of FIG. 3 described later.

On the contrary, in case of $XS>-X_C$, ECU 8 determines that there is a less tendency for the host vehicle to deviate from the current driving lane to the right, and thus the routine proceeds from step S21 to step S23.

At step S23, lane-deviation decision flag $F_{LD}$ is reset to "0". Thereafter, the routine proceeds from step S23 to step S24.

At step S24, a check is made to determine whether lane-changing indicative flag $F_{LC}$ is set to "1". In case of $F_{LC}=1$, the routine proceeds from step S24 to step S25.

At step S25, lane-deviation decision flag $F_{LD}$ is reset to "0". Thereafter, the routine advances from step S25 to step S26 of FIG. 3.

Conversely in case of $F_{LC}=0$, the routine proceeds from step S24 to step S26 of FIG. 3.

At step S26, a check is made to determine whether lane-deviation decision flag $F_{LD}$ is reset to "0". In case of $F_{LD}=0$, step S27 occurs.

At step S27, a lane deviation avoidance control canceling flag or a lane deviation avoidance control inhibiting flag $F_{CA}$ is reset to "0". Thereafter, the routine proceeds from step S27 to step S30.

Conversely in case of $F_{LD}=1$, the routine proceeds from step S26 to step S28.

At step S28, a check is made to determine whether the absolute value $|XS_{(n-1)}-XS_{(n)}|$ of the difference between the previous value $XS_{(n-1)}$ of lane-deviation estimate XS and the current value $XS_{(n)}$ of lane-deviation estimate XS is greater than or equal to a predetermined threshold value $L_{XS}$, which is provided to determine the continuity or discontinuity of lane-deviation estimate XS. In case of $|XS_{(n-1)}-XS_{(n)}|<L_{XS}$, ECU 8 determines that lane-deviation estimate XS is continuous, and thus the routine proceeds from step S28 to step S30. Conversely in case of $|XS_{(n-1)}-XS_{(n)}|\geq L_{XS}$, ECU 8 determines that lane-deviation estimate XS is discontinuous, and thus the routine proceeds from step S28 to step S29.

At step S29, lane deviation avoidance control inhibiting flag $F_{CA}$ is set to "1". Thereafter, the routine proceeds from step S29 to step S30.

At step S30, a check is made to determine whether lane-deviation decision flag $F_{LD}$ is unequal to "0", that is, $F_{LD}\neq 0$, and additionally lane deviation avoidance control inhibiting flag $F_{CA}$ is reset to "0", that is, $F_{CA}=0$. In case of $F_{LD}\neq 0$ and $F_{CA}=0$, the routine proceeds from step S30 to step S31.

Figure 4:
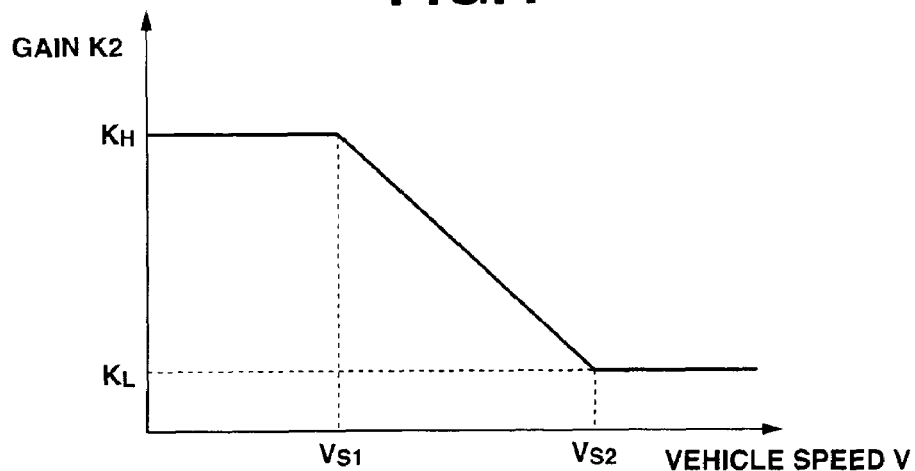
FIG. 4 is a predetermined vehicle-speed V versus gain K2 characteristic map.

At step S31, a desired yawing moment $Ms_0$ is arithmetically calculated based on lane-deviation estimate XS and predetermined lane-deviation criterion $X_C$, from the following expression (2).

$$Ms_0=-K1\times K2\times(XS-X_C) \qquad (2)$$

where K1 denotes a constant that is determined by specifications of the host vehicle, and K2 denotes a variable gain that varies depending on the host vehicle's speed V. Actually, variable gain K2 is calculated or retrieved from the predetermined vehicle-speed V versus gain K2 characteristic map of FIG. 4 showing how a gain K2 has to be varied relative to a host vehicle's speed V. As can be appreciated from the preprogrammed characteristic map of FIG. 4 showing the relationship between the gain K2 and vehicle speed V, in a low speed range ($0\leq V\leq V_{S1}$) from 0 to a predetermined low speed value $V_{S1}$, gain K2 is fixed to a predetermined relatively high gain $K_H$. In a middle and high speed range ($V_{S1}<V\leq V_{S2}$) from the predetermined low speed value $V_{S1}$ to a predetermined high speed value $V_{S2}$ (higher than $V_{S1}$), gain K2 gradually reduces to a predetermined relatively low gain $K_L$, as the host vehicle's speed V increases. In an excessively high speed range ($V_{S2}<V$) above predetermined high speed value $V_{S2}$, gain K2 is fixed to predetermined relatively low gain $K_L$.

Conversely when the decision result of step S30 is negative, that is, in case of $F_{LD}=0$ or $F_{CA}=1$, the routine proceeds from step S30 to step S32.

At step S32, desired yawing moment $Ms_0$ is set to "0". Thereafter, the routine proceeds from step S32 to step S33.

Figure 5:
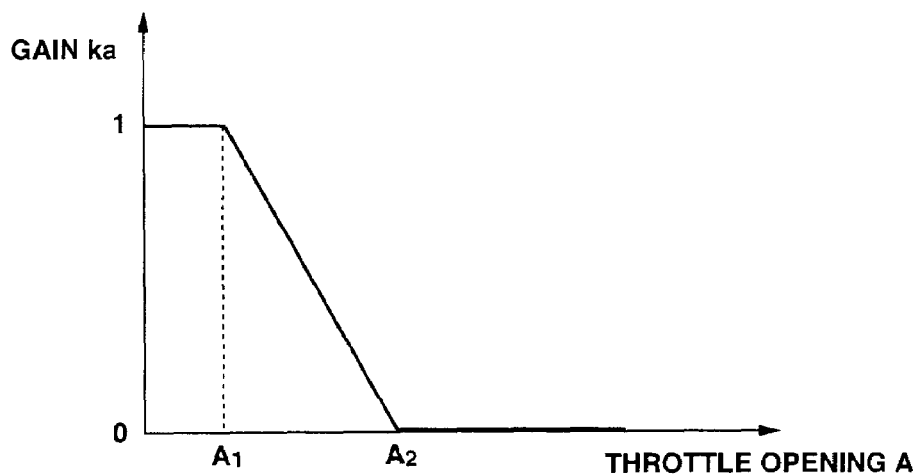
FIG. 5 is a predetermined A-ka characteristic map.

At step S33, an accelerator sensitive gain (or a throttle sensitive gain) ka is calculated or retrieved based on throttle opening A, read through step S1, from the predetermined A-ka characteristic map of FIG. 5 showing how an accelerator sensitive gain ka has to be varied relative to a throttle opening A. As can be seen from the preprogrammed A-ka characteristic map of FIG. 5, in a low throttle-opening range ($0\leq A\leq A_1$) from 0 to a predetermined low throttle opening $A_1$, accelerator sensitive gain ka is fixed to a predetermined high gain such as "1". In a middle and high throttle opening range ($A_1<A\leq A_2$) from the predetermined low throttle opening $A_1$ to a predetermined high throttle opening $A_2$ (higher than $A_1$), accelerator sensitive gain ka gradually reduces to a predetermined low gain such as "0", as throttle opening A increases. In an excessively high throttle opening range ($A_2<A$) above predetermined high throttle opening $A_2$, accelerator sensitive gain ka is fixed to the predetermined low gain such as "0".

Figure 6:
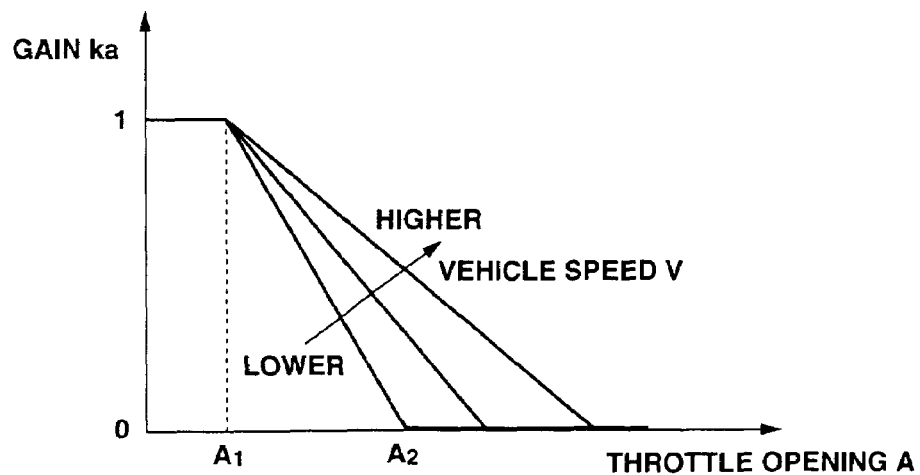
FIG. 6 is a predetermined A-V-ka characteristic map, which is a modification of the A-ka map shown in FIG. 5.

In accordance with the preprogrammed A-ka characteristic map shown in FIG. 5, accelerator sensitive gain ka is determined or map-retrieved based on only a single parameter, namely throttle opening A. In lieu thereof, as can be appreciated from the modified A-V-ka characteristic map shown in FIG. 6, accelerator sensitive gain ka may be determined or map-retrieved based on two parameters, that is, the host vehicle's speed V as well as throttle opening A. According to the A-V-ka characteristic map shown in FIG. 6, when throttle opening A increases from predetermined low throttle opening $A_1$ within the throttle opening range above predetermined low throttle opening $A_1$, accelerator sensitive gain ka tends to decrease in accordance with the increase in throttle opening A and additionally accelerator sensitive gain ka for the same throttle opening A tends to increase in accordance with the increase in the host vehicle's speed V. In other words, in the throttle opening range above predetermined low throttle opening $A_1$, the rate of decrease in accelerator sensitive gain ka with respect to throttle opening A is set to be in inverse proportion to the host vehicle's speed V.

Figure 7A:
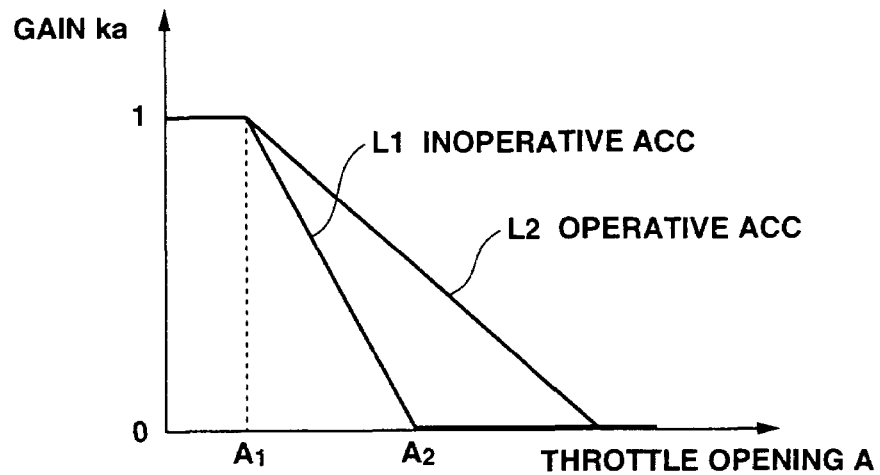
FIG. 7A is a first predetermined A-ka characteristic map having two different characteristics L1 and L2 respectively used for inoperative and operative states of an ACC system.
Figure 7B:
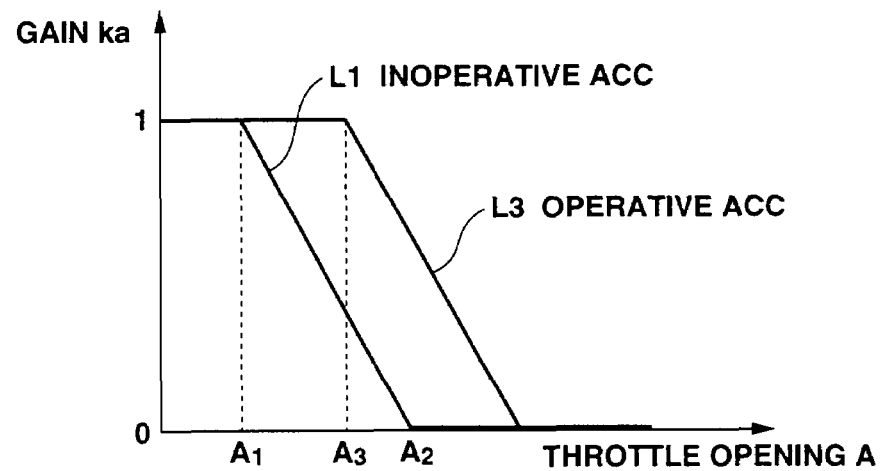
FIG. 7B is a second predetermined A-ka characteristic map having two different characteristics L1 and L3 respectively used for inoperative and operative states of the ACC system.
Figure 7C:
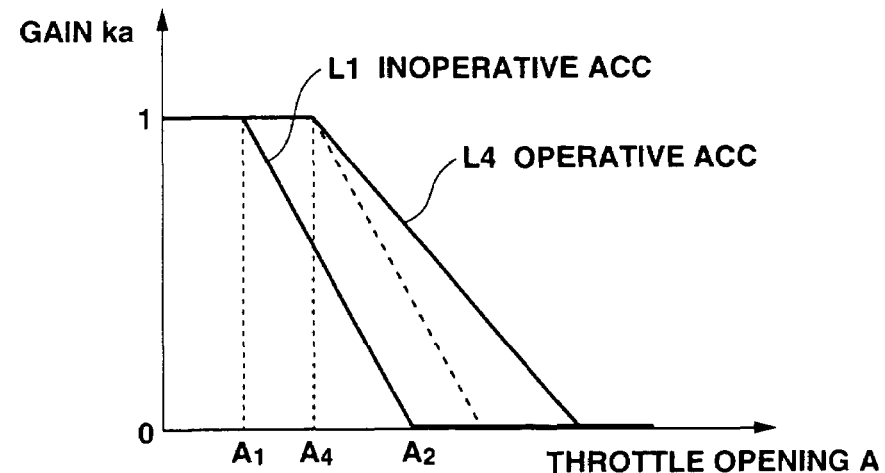
FIG. 7C is a third predetermined A-ka characteristic map having two different characteristics L1 and L4 respectively used for inoperative and operative states of the ACC system.
Figure 8A:
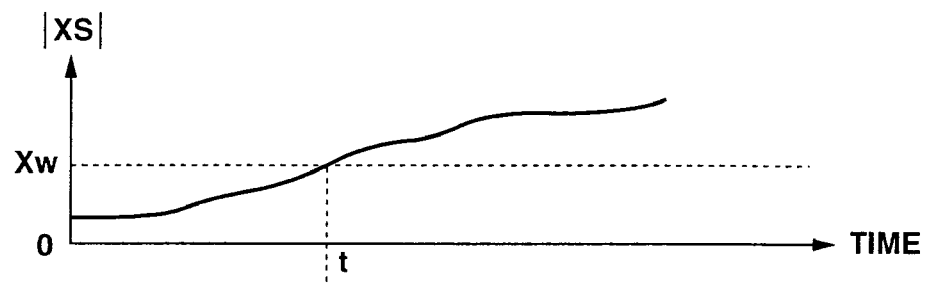
FIGS. 8A–8D are time charts explaining the operation of the system of the first embodiment during lane-changing operation, respectively showing variations in a lane-deviation estimate |XS|, a throttle opening A, a final desired yawing moment |Ms|, and a desired braking pressure difference $\Delta Ps_F$.
Figure 8B:
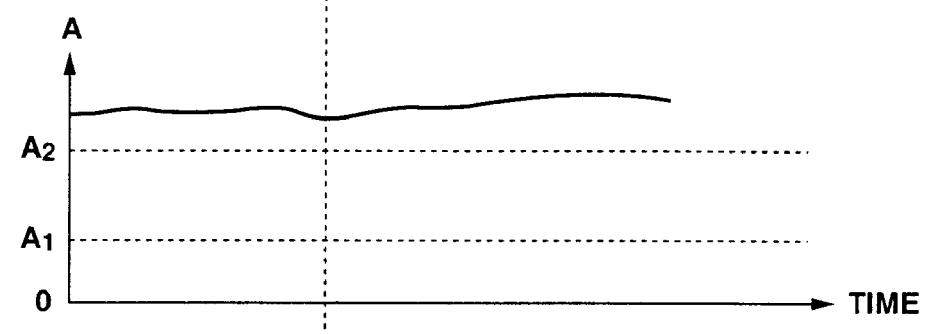
Figure 8C:
Figure 8D:

In lieu thereof, in an ACC system equipped vehicle that the host vehicle's speed V can be controlled depending on the inter-vehicle distance between the host vehicle and the preceding vehicle, a throttle opening A versus accelerator sensitive gain ka characteristic may be varied depending on whether the ACC is inoperative or operative (see FIGS. 7A–7C). This is because, in the operative state of the ACC system, it is impossible to reflectively attain a decrease in throttle opening A by the driver just after warning system 23 warns the driver that there is an increased tendency for the host vehicle to deviate from the current driving lane. Thus, as compared to the inoperative state of the ACC system, it is desirable to relatively increasingly compensate for the desired yawing moment during the operative state of the ACC system. Increasingly compensating for the desired yawing moment ensures a good response to correction of the host vehicle's course during the operative state of the ACC system. For the reasons set out above, as shown in the first predetermined A-ka characteristic map of FIG. 7A, an A-ka characteristic suited to the ACC-system inoperative state is set to the first A-ka characteristic L1 according to which accelerator sensitive gain ka relatively quickly decreases from "1" as throttle opening A increases from predetermined low throttle opening $A_1$. On the other hand, an A-ka characteristic suited to the ACC-system operative state is set to the second A-ka characteristic L2 according to which accelerator sensitive gain ka relatively moderately decreases from "1" as throttle opening A increases from predetermined low throttle opening $A_1$. That is, as compared to the ACC-system inoperative state, during the ACC-system operative state the rate of decrease in accelerator sensitive gain ka with respect to throttle opening A is set to a relatively lower rate (see the relatively moderate down-sloped gradient of the second A-ka characteristic L2 of FIG. 7A).

Referring now to FIG. 7B, there is shown the second predetermined A-ka characteristic map having two different characteristics L1 and L3 respectively used for inoperative and operative states of the ACC system, and modified from the A-ka map shown in FIG. 7A. As shown in the second predetermined A-ka characteristic map of FIG. 7B, an A-ka characteristic suited to the ACC-system inoperative state is set to the first A-ka characteristic L1 as discussed above. On the other hand, an A-ka characteristic suited to the ACC-system operative state is set to the third A-ka characteristic L3 according to which accelerator sensitive gain ka begins to decrease from "1" when throttle opening A increases from a throttle opening exceeding a predetermined middle throttle opening $A_3$ that is higher than predetermined low throttle opening $A_1$. In the characteristic diagram shown in FIG. 7B, the rate of decrease in accelerator sensitive gain ka with respect to throttle opening A is the same for the inoperative and operative states of the ACC system (see the same down-sloped gradients of the first and third A-ka characteristics L1 and L3 of FIG. 7B).

Referring now to FIG. 7C, there is shown the third predetermined A-ka characteristic map having two different characteristics L1 and L4 respectively used for inoperative and operative states of the ACC system, and modified from the A-ka map shown in FIGS. 7A and 7B. As shown in the third predetermined A-ka characteristic map of FIG. 7C, an A-ka characteristic suited to the ACC-system inoperative state is set to the first A-ka characteristic L1 as discussed above. On the other hand, an A-ka characteristic suited to the ACC-system operative state is set to the third A-ka characteristic L3 according to which accelerator sensitive gain ka begins to decrease from "1" when throttle opening A increases from a throttle opening exceeding a predetermined middle throttle opening $A_4$ that is higher than predetermined low throttle opening $A_1$ and additionally accelerator sensitive gain ka relatively moderately decreases from "1" at the relatively lower rate of decrease in accelerator sensitive gain ka with respect to throttle opening A as throttle opening A increases from predetermined middle throttle opening $A_4$.

After step S33 of FIG. 3, step S34 occurs.

At step S34, a final desired yawing moment Ms is arithmetically calculated based on desired yawing moment $Ms_0$ calculated through step S31 and accelerator sensitive gain ka calculated through step S33, from the following expression (3).

$$Ms = ka \times Ms_0 \qquad (3)$$

Thereafter, step S35 occurs.

At step S35, a check is made to determine whether lane-deviation decision flag $F_{LD}$ is reset to "0" or lane deviation avoidance control inhibiting flag $F_{CA}$ is set to "1". In case of $F_{LD}=0$ or $F_{CA}=1$, the routine proceeds from step S35 to step S36.

At step S36, front-left and front-right desired wheel-brake cylinder pressures $Ps_{FL}$ and $Ps_{FR}$ are set to master-cylinder pressure Pm (see the following expression (4)), whereas rear-left and rear-right desired wheel-brake cylinder pressures $Ps_{RL}$ and $Ps_{RR}$ are set to a rear-wheel brake pressure or a rear-wheel master-cylinder pressure Pmr (see the following expression (5)), which is calculated and usually reduced from master-cylinder pressure Pm taking into account wheel-brake cylinder pressure distribution between front and rear wheel brakes. Thereafter, the routine proceeds from step S36 to step S43.

$$Ps_{FL} = Ps_{FR} = Pm \qquad (4)$$

$$Ps_{RL} = Ps_{RR} = Pmr \qquad (5)$$

Conversely in case of $F_{LD} \neq 0$ and $F_{CA} = 0$, the routine proceeds from step S35 to step S37.

At step S37, a check is made to determine whether the absolute value |Ms| of final desired yawing moment Ms is less than a preset value Ms1. In case of |Ms|<Ms1, the routine proceeds from step S37 to step S38.

At step S38, a front desired wheel-brake cylinder pressure difference $\Delta Ps_F$ between front-left and front-right desired wheel-brake cylinder pressures $Ps_{FL}$ and $Ps_{FR}$ is set to "0" (see the following expression (6)). On the other hand, a rear desired wheel-brake cylinder pressure difference $\Delta Ps_R$ between rear-left and rear-right desired wheel-brake cylinder pressures $Ps_{RL}$ and $Ps_{RR}$ is set to $2 \cdot K_{BR} \cdot |Ms|/T$ (see the following expression (7)). Thereafter, the routine proceeds from step S38 to step S40.

$$\Delta Ps_F = 0 \qquad (6)$$

$$\Delta Ps_R = 2 \cdot K_{BR} \cdot |Ms|/T \qquad (7)$$

where $K_{BR}$ denotes a conversion factor used to convert a rear-wheel braking force to a rear wheel-brake cylinder pressure, and T denotes a tread between front road wheels (or between rear road wheels) and the tread T is the same for the front and rear wheels.

Conversely in case of $|Ms| \geq Ms1$, the routine proceeds from step S37 to step S39.

At step S39, front desired wheel-brake cylinder pressure difference $\Delta Ps_F$ between front-left and front-right desired wheel-brake cylinder pressures $Ps_{FL}$ and $Ps_{FR}$ is set to $2 \cdot K_{BF} \cdot (|Ms|-Ms1)/T$ (see the following expression (8)). On the other hand, rear desired wheel-brake cylinder pressure difference $\Delta Ps_R$ between rear-left and rear-right desired wheel-brake cylinder pressures $Ps_{RL}$ and $Ps_{RR}$ is set to $2 \cdot K_{BR} \cdot Ms1/T$ (see the following expression (9)). Thereafter, the routine proceeds from step S39 to step S40.

$$\Delta Ps_F = 2 \cdot K_{BF} \cdot (|Ms|-Ms1)/T \qquad (8)$$

$$\Delta Ps_R = 2 \cdot K_{BR} \cdot Ms1/T \qquad (9)$$

where $K_{BF}$ denotes a conversion factor used to convert a front-wheel braking force to a front wheel-brake cylinder pressure and $K_{BR}$ denotes a conversion factor used to convert a rear-wheel braking force to a rear wheel-brake cylinder pressure, and conversion factors $K_{BF}$ and $K_{BR}$ are determined depending on brake specifications, and T denotes a tread between front road wheels (or between rear road wheels) and the tread T is the same for the front and rear wheels.

In setting front and rear desired wheel-brake cylinder pressure differences $\Delta Ps_F$ and $\Delta Ps_R$, executed through step S39 of FIG. 3, the system of the first embodiment actually sets both of the front and rear desired brake fluid pressure differences $\Delta Ps_F$ and $\Delta Ps_R$ from the respective expressions (8) and (9). Instead of producing the desired yawing moment used to prevent the host vehicle from deviating from the current driving lane by creating both of the front and rear desired brake fluid pressure differences $\Delta Ps_F$ and $\Delta Ps_R$, the desired yawing moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the following expressions (8)' and (9)'.

$$\Delta Ps_F = 2 \cdot K_{BF} \cdot |Ms|/T \tag{8}'$$

$$\Delta Ps_R = 0 \tag{9}'$$

At step S40, a check is made to determine whether final desired yawing moment Ms is less than "0". When the answer to step S40 is in the affirmative (Ms<0), the routine proceeds from step S40 to step S41. The negative final desired yawing moment Ms means a component of the moment vector tending to rotate the host vehicle about the z-axis counterclockwise, when looking in the positive direction of the z-axis. The positive final desired yawing moment Ms means a component of the moment vector tending to rotate the host vehicle about the z-axis clockwise, when looking in the positive direction of the z-axis.

At step S41, front-left desired wheel-brake cylinder pressure $Ps_{FL}$ is set to master-cylinder pressure Pm (see the following expression (10)), front-right desired wheel-brake cylinder pressure $Ps_{FR}$ is set to the sum (Pm+≠$Ps_F$) of master-cylinder pressure Pm and front desired wheel-brake cylinder pressure difference $\Delta Ps_F$ (see the following expression (11)), rear-left desired wheel-brake cylinder pressure $Ps_{RL}$ is set to rear-wheel master-cylinder pressure Pmr (see the following expression (12)), and rear-right desired wheel-brake cylinder pressure $Ps_{RR}$ is set to the sum (Pmr+$\Delta Ps_R$) of rear-wheel master-cylinder pressure Pmr and rear desired wheel-brake cylinder pressure difference $\Delta Ps_R$ (see the following expression (13)). Thereafter, the routine proceeds from step S41 to step S43.

$$Ps_{FL} = Pm \tag{10}$$

$$Ps_{FR} = Pm + \Delta Ps_F \tag{11}$$

$$Ps_{RL} = Pmr \tag{12}$$

$$Ps_{RR} = Pmr + \Delta Ps_R \tag{13}$$

Conversely when the answer to step S40 is in the negative (Ms≧0), the routine proceeds from step S40 to step S42.

At step S42, front-left desired wheel-brake cylinder pressure $Ps_{FL}$ is set to the sum (Pm+$\Delta Ps_F$) of master-cylinder pressure Pm and front-desired wheel-brake cylinder pressure difference $\Delta Ps_F$ (see the following expression (14)), front-right desired wheel-brake cylinder pressure $Ps_{FR}$ is set to master-cylinder pressure Pm (see the following expression (15)), rear-left desired wheel-brake cylinder pressure $Ps_{RL}$ is set to the sum (Pmr+$\Delta Ps_R$) of rear-wheel master-cylinder pressure Pmr and rear desired wheel-brake cylinder pressure difference $\Delta Ps_R$ (see the following expression (16)), and rear-right desired wheel-brake cylinder pressure $Ps_{RR}$ is set to rear-wheel master-cylinder pressure Pmr (see the following expression (17)). Thereafter, the routine proceeds from step S42 to step S43.

$$Ps_{FL} = Pm + \Delta Ps_F \tag{14}$$

$$Ps_{FR} = Pm \tag{15}$$

$$Ps_{RL} = Pmr + \Delta Ps_R \tag{16}$$

$$Ps_{RR} = Pmr \tag{17}$$

At step S43, a check is made to determine whether lane-deviation decision flag $F_{LD}$ is unequal to "0". When the answer to step S43 is in the affirmative ($F_{LD} \neq 0$), the routine proceeds from step S43 via step S44 to step S46.

At step S44, a desired driving torque Trq is arithmetically calculated from the following expression (18).

$$Trq = f(A) - g(Ps) \tag{18}$$

where f(A) is a function of throttle opening A and the function f(A) is provided to calculate a desired driving torque that is determined based on throttle opening A, Ps denotes the sum (Ps=$\Delta Ps_F$+$\Delta Ps_R$) of front and rear desired wheel-brake cylinder pressure differences $\Delta Ps_F$ and $\Delta Ps_R$ to be produced during the lane deviation avoidance control, and g(Ps) is a function of the summed desired wheel-brake cylinder pressure difference Ps and the function g(Ps) is provided to calculate a desired braking torque that is determined based on the summed desired wheel-brake cylinder pressure difference Ps.

Conversely when the answer to step S43 is in the negative ($F_{LD}$=0), the routine proceeds from step S43 via step S45 to step S46.

At step S45, desired driving torque Trq is arithmetically calculated from the following expression (19).

$$Trq = f(A) \tag{19}$$

where f(A) is a function of throttle opening A and the function f(A) is provided to calculate a desired driving torque based on throttle opening A.

At step S46, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through steps S36, S41 or S42, are output from the input interface of ECU 8 to hydraulic modulator 7, and at the same time a command signal corresponding to desired driving torque Trq, calculated through steps S44 or S45, is output from the output interface of ECU 8 to driving torque controller 12. In this manner, one cycle of the time-triggered interrupt routine (the lane deviation avoidance control routine executed by the system of the first embodiment shown in FIGS. 1–3) terminates and the predetermined main program is returned.

In the system of the first embodiment described previously, throttle opening sensor 18 of FIG. 1 serves as a throttle opening detection section (throttle opening detection means). In the lane deviation avoidance control routine shown in FIGS. 2 and 3, steps S3–S13 and S19–S25 serve as a lane-deviation decision section (lane-deviation decision means). Steps S30–S32 serve as a host vehicle's course correction value calculation section (host vehicle's course correction value calculation means). Steps S33–S34 serve as a host vehicle's course correction value compensation section (host vehicle's course correction value compensation means). Steps S35–S42 and S46 and hydraulic modulator 7 of FIG. 1 serve as a host vehicle's course correction section (host vehicle's course correction means). Desired yawing moment $Ms_0$ corresponds to a host vehicle's course correction value. Steps S26–S46 of FIG. 3 and hydraulic modulator 7 of FIG. 1 serve as a lane-deviation avoidance section (lane-deviation avoidance means).

The system of the first embodiment operates as follows.

Suppose that the host vehicle is running along the current driving lane with the accelerator manipulated variable (or throttle opening A) held constant. At this time, lane-deviation decision flag FLD becomes "0" (see step S23 of FIG. 2), and thus desired yawing moment $Ms_0$ (consequently, final desired yawing moment Ms) is set to "0" (see step S32 of FIG. 3). Therefore, front-left and front-right desired wheel-brake cylinder pressures $Ps_{FL}$ and $Ps_{FR}$ are set to master cylinder pressure Pm based on the driver's braking action, while rear-left and rear-right desired wheel-brake cylinder pressures $Ps_{RL}$ and $Ps_{RR}$ are set to rear-wheel master cylinder pressure Pmr based on the driver's braking action (see step S36 of FIG. 3 and the expressions (4) and (5)). As a result, the host vehicle's running condition based on the driver's steering action can be maintained.

Under these conditions, when the host vehicle begins to gradually deviate from the central axis of the current host vehicle's driving lane without turning direction indicator switch 22 on and thus the absolute value |XS| of lane-deviation estimate XS becomes greater than or equal to predetermined alarm criterion $X_W$, warning system 23 warns the driver of the increased tendency of lane deviation from the current host vehicle's driving lane (see step S15 of FIG. 2). Thereafter, as soon as the absolute value |XS| of lane-deviation estimate XS becomes greater than or equal to predetermined lane-deviation criterion $X_C$ and thus the condition defined by $F_{LD} \neq 0$ (that is, $F_{LD}=1$ or $F_{LD}=-1$) becomes satisfied (see steps S20 or S22 of FIG. 2), desired yawing moment $Ms_0$, acting on the host vehicle in a direction that the lane deviation is avoided, is calculated from the previously-discussed expression (2) (see step S31 of FIG. 3). Actually, during lane-changing operation the driver often turns direction indicator switch 22 on by intention or the driver often forgets to turn on direction indicator switch 22. Thus, it is difficult to precisely determine the presence or absence of a driver's intention for lane changing, only depending on whether direction indicator switch 22 is turned on or off. However, when warning system 23 warns the driver of lane deviation from the current host vehicle's driving lane, the driver that does not yet recognize the tendency of lane deviation, generally tends to reflectively release the accelerator pedal. On the contrary, in the presence of the driver's intention for lane changing, the driver determines or judges that warning system 23 comes into operation because direction indicator switch 22 remains turned off, and thus the driver never releases the accelerator pedal. For the reasons set out above, it is possible to more precisely determine the presence or absence of a driver's intention for lane changing depending on whether or not the driver releases the accelerator pedal when warning system 23 comes into operation. Therefore, according to the system of the first embodiment, the throttle-opening A dependent accelerator sensitive gain ka is calculated or map-retrieved (see step S33), and desired yawing moment $Ms_0$ is compensated for based on accelerator sensitive gain ka in accordance with the expression (3), that is, $Ms=ka \times Ms_0$ (see step S34). Additionally, in order to produce final desired yawing moment Ms compensated for, each of desired wheel-brake cylinder pressures $Ps_{FL}$, $Ps_{FR}$, $Ps_{RL}$, and $Ps_{RR}$ is set or determined (see steps S41 or S42 of FIG. 3), and whereby it is possible to more precisely correct the host vehicle's course in the direction that the lane deviation is avoided, to match to the driver's wishes.

That is, as can be appreciated from the time charts shown in FIGS. 8A–8D, assuming that a drop in throttle opening A does not occur and throttle opening A is held at a higher level than predetermined high throttle opening $A_2$ (see FIG. 8B) even after the absolute value |XS| of lane-deviation estimate XS becomes greater than or equal to predetermined alarm criterion $X_W$ at a time t (see FIG. 8A) and thus warning system 23 comes into operation just after the time t, ECU 8 determines that the tendency of lane deviation is based on the driver's intention for lane changing. In such a case, accelerator sensitive gain ka is set to "0", and as a result final desired yawing moment Ms, which is compensated for based on accelerator sensitive gain ka, is also set to "0" (see FIG. 8C). As a consequence, desired wheel-brake cylinder pressure differences $\Delta Ps_F$ and $\Delta Ps_R$ are set to "0" (see FIG. 8D), and thus the host vehicle's course correction to the lane-deviation avoidance direction is not made. In other words, priority is given to the driver's steering action rather than the host vehicle's course correction to the lane-deviation avoidance direction. That is, according to the system of the first embodiment, it is possible to prevent the lane deviation avoidance control (the host vehicle's course correction to the lane-deviation avoidance direction) from undesirably interfering with the lane-changing operation based on the driver's intention, thus realizing a smooth lane-changing operation by way of a steering action taken manually by the driver.

Figure 9A:
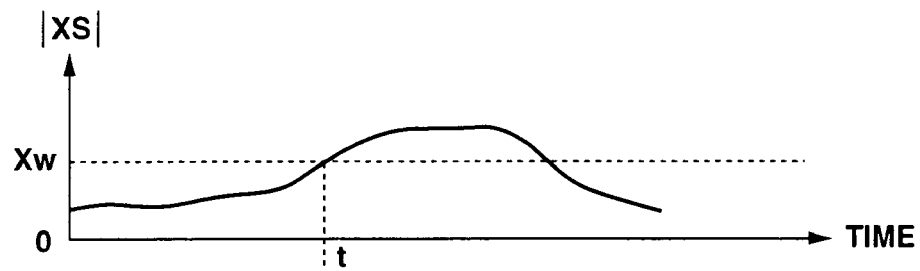
FIGS. 9A–9D are time charts explaining the operation of the system of the first embodiment in presence of increased tendencies of lane deviation with no driver's intention for lane changing, respectively showing variations in lane-deviation estimate |XS|, throttle opening A, final desired yawing moment |Ms|, and desired braking pressure difference $\Delta Ps_F$.
Figure 9B:
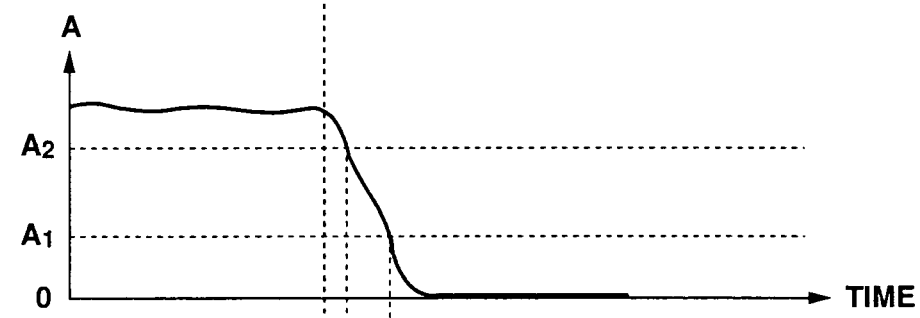
Figure 9C:
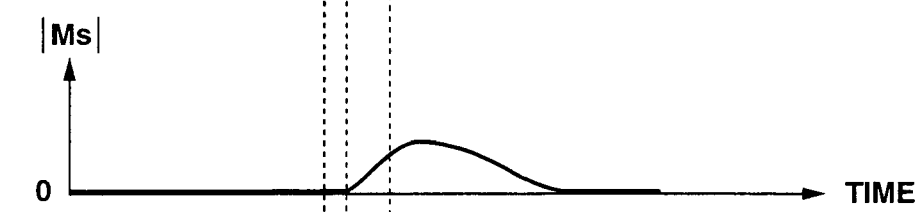
Figure 9D:
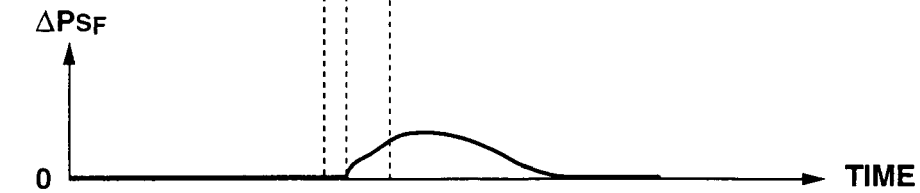

On the contrary, as can be appreciated from the time charts shown in FIGS. 9A–9D, assuming that the driver releases the accelerator pedal and thus a drop in throttle opening A occurs after the absolute value |XS| of lane-deviation estimate XS becomes greater than or equal to predetermined alarm criterion $X_W$ at a time t (see FIG. 9A) and thus warning system 23 comes into operation just after the time t, ECU 8 determines that the tendency of lane deviation is not based on the driver's intention for lane changing. Therefore, as soon as throttle opening A becomes less than predetermined high throttle opening $A_2$ just after t (see FIG. 9B), accelerator sensitive gain ka begins to gradually increase from "0" to "1". Thereafter, with the accelerator released, when throttle opening A becomes less than predetermined low throttle opening $A_1$, accelerator sensitive gain ka is set to "1". As shown in FIG. 9C, final desired yawing moment Ms, which is compensated for based on accelerator sensitive gain ka, tends to increase up to a desired yawing-moment value based on the degree of the host vehicle's lane deviation, that is, lane-deviation estimate XS. As a consequence, as shown in FIG. 9D, desired wheel-brake cylinder pressure difference $\Delta Ps_F$ also tends to gradually increase from "0" in accordance with the increase in final desired yawing moment Ms, and whereby the host vehicle's course correction to the lane-deviation avoidance direction is made. At the same time, the driver is warned of the lane deviation by warning system 23, and thus recognizes the tendency of lane deviation. At once, the driver that has recognized the tendency of lane deviation, releases the accelerator pedal, and simultaneously starts to correct the host vehicle's course by way of a manual steering action. Therefore, it is possible to rapidly avoid the tendency of lane deviation by way of both of the yawing moment produced by the lane deviation avoidance control and exerted on the host vehicle and the steering action taken manually by the driver.

In the first embodiment, predetermined lane-deviation criterion $X_C$ is set to a predetermined fixed value. Actually, a lane width L of each of driving lanes is not fixed constant. Thus, predetermined lane-deviation criterion $X_C$ may be a variable, which is determined depending on lane width L of each of driving lanes. The lane width L itself can be obtained by image-processing the image data from CCD camera 13 or by extracting input information regarding the lane width of the current driving lane, utilizing a navigation system. In this case, predetermined lane-deviation criterion $X_C$, which is a variable, can be calculated from the following expression (20).

$$X_C = \min\{(L/2 - Lc/2), 0.8\} \quad (20)$$

where Lc denotes a host vehicle's width. As can be appreciated from the above expression (20), predetermined lane-deviation criterion $X_C$ is obtained as a lower one of the value (L/2−Lc/2) and 0.8 by way of a so-called select-LOW process.

In lieu thereof, in case of an automated highway equipped with an infrastructure, a distance data (L/2−XS), which is obtained and received by way of mutual communication between the host vehicle and the on-road network (or the on-road sensor) contained in the infrastructure, may be used as input information regarding an estimate of predetermined lane-deviation criterion $X_C$.

In the system of the first embodiment, the yawing moment, which is based on final yawing moment Ms and acts on the host vehicle in the lane-deviation avoidance direction, is produced by way of only the braking force control, that is, only the wheel-brake cylinder pressure control for wheel-brake cylinder pressures $Ps_{FL}$, $Ps_{FR}$, $Ps_{RL}$, and $Ps_{RR}$. In lieu thereof, in case of the driving force control system (the driving torque control system) for each of road wheels, as well as the braking force control system (the braking torque control system), the yawing moment, which acts on the host vehicle in the lane-deviation avoidance direction, may be produced by way of the driving force control as well as the braking force control.

As described previously, according to the system of the first embodiment, desired yawing moment $Ms_0$, which is needed to avoid the tendency of lane deviation from the current host vehicle's driving lane, is arithmetically calculated by way of steps S30–S32. In order to compute final desired yawing moment Ms, the calculated desired yawing moment $Ms_0$ is properly compensated for based on throttle opening A by way of steps S33 and S34. The yawing moment, which is based on final yawing moment Ms and exerts on the host vehicle in the lane-deviation avoidance direction, is produced through steps S35–S42 and S46 and by means of hydraulic modulator 7. With the previously-discussed arrangement of the first embodiment, it is possible to more precisely determine, based on throttle opening A that varies depending on an accelerator manipulated variable obtained after the driver has already recognized the tendency of lane deviation, whether or not the host vehicle's lane-deviation tendency is based on the driver's intention. Concretely, if the accelerator pedal is released by the driver just after the driver has recognized the tendency of lane deviation, ECU 8 determines that the host vehicle's lane-deviation tendency is not based on the driver's intention. Conversely, if the accelerator pedal is not released by the driver just after the driver has recognized the tendency of lane deviation, ECU 8 determines that the host vehicle's lane-deviation tendency is based on the driver's intention. Thus, it is possible to more precisely correct the host vehicle's course in the direction that the lane deviation is avoided, to match to the driver's wishes.

Additionally, according to the system of the first embodiment, as can be appreciated from the A-ka characteristic diagrams shown in FIGS. 5, 6, and 7A–7C, compensation for desired yawing moment $Ms_0$ is initiated from the time when throttle opening A exceeds predetermined low throttle opening $A_1$ (serving as a desired-yawing-moment compensation starting throttle opening), and desired yawing moment $Ms_0$ is decreasingly compensated for in accordance with an increase in throttle opening A. That is, when the magnitude of throttle opening A obtained after the driver has recognized the tendency of lane deviation remains large, ECU 8 determines that the presence of the driver's intention of lane changing, and thus the magnitude of the desired yawing moment to be exerted on the host vehicle is decreasingly compensated for. Conversely when the magnitude of throttle opening A obtained after the driver has recognized the tendency of lane deviation reduces to below predetermined low throttle opening $A_1$, ECU 8 determines that the absence of the driver's intention of lane changing, and thus it is possible to exert the desired yawing moment based on the degree of lane-deviation tendency, in other words, lane-deviation estimate XS, on the host vehicle.

Additionally, in an ACC system equipped vehicle that the host vehicle's speed V can be controlled depending on the inter-vehicle distance between the host vehicle and the preceding vehicle, in compensating for desired yawing moment $Ms_0$ based on throttle opening A, desired yawing moment $Ms_0$ is compensated for so that a correction factor (gain ka) suited for the operative state of the ACC system is relatively higher than a correction factor (gain ka) suited for the inoperative state of the ACC system for the same throttle opening A (see FIGS. 7A–7C). This enhances and improves the response to correction of the host vehicle's course during the operative state of the ACC system.

Furthermore, according to the system of the first embodiment, as can be seen from the A-ka characteristic maps shown in FIGS. 7B and 7C, the ACC-operative-state desired-yawing-moment compensation starting throttle opening (predetermined low throttle opening $A_1$) at which compensation for desired yawing moment $Ms_0$ is initiated or started, is set to be higher than the ACC-inoperative-state desired-yawing-moment compensation starting throttle opening (predetermined middle throttle opening $A_3$ in FIG. 7B or predetermined middle throttle opening $A_4$ in FIG. 7C). Thus, it is possible to provide a good response to correction of the host vehicle's course during the operative state of the ACC system.

Moreover, according to the system of the first embodiment, lane-deviation estimate XS, in other words, an estimate of a future lateral deviation, is estimated or arithmetically calculated based on at least the host vehicle's yaw angle φ with respect to the direction of the current host vehicle's driving lane, lateral deviation X from the central axis of the current host vehicle's driving lane, curvature β of the current host vehicle's driving lane, and host vehicle speed V (see the expression (1)). ECU 8 determines that there is a possibility or an increased tendency of lane deviation of the host vehicle from the current driving lane, when lane-deviation estimate XS becomes greater than or equal to predetermined lane-deviation criterion $X_C$. Thus, it is possible to more precisely determine whether the host vehicle tends to deviate from the current driving lane.

Additionally, according to the system of the first embodiment, desired yawing moment $Ms_0$ (or final desired yawing moment Ms) is calculated based on the deviation (XS−$X_C$) between lane-deviation estimate XS and predetermined lane-deviation criterion $X_C$. Thus, it is possible to more exactly calculate desired yawing moment Ms, taking into account the degree of the future lateral-deviation tendency of the host vehicle.

Furthermore, the system of the first embodiment is constructed in such a manner as to produce the yawing moment (corresponding to final desired yawing moment Ms) to be exerted on the host vehicle in the direction that the lane deviation is avoided, by controlling front-left, front-right, rear-left, and rear-right wheel-brake cylinder pressures $Ps_{FL}$, $Ps_{FR}$, $Ps_{RL}$, and $Ps_{RR}$ independently of each other. Thus, it is possible to more precisely correct the host vehicle's course in the direction that the lane deviation is avoided. Also, the system of the first embodiment can control automatically arbitrarily wheel-brake cylinder pressures $Ps_{FL}$, $Ps_{FR}$, $Ps_{RL}$, and $Ps_{RR}$ (in other words, braking forces applied to respective road wheels) independently of each other, irrespective of the braking action of the driver.

Figure 10:
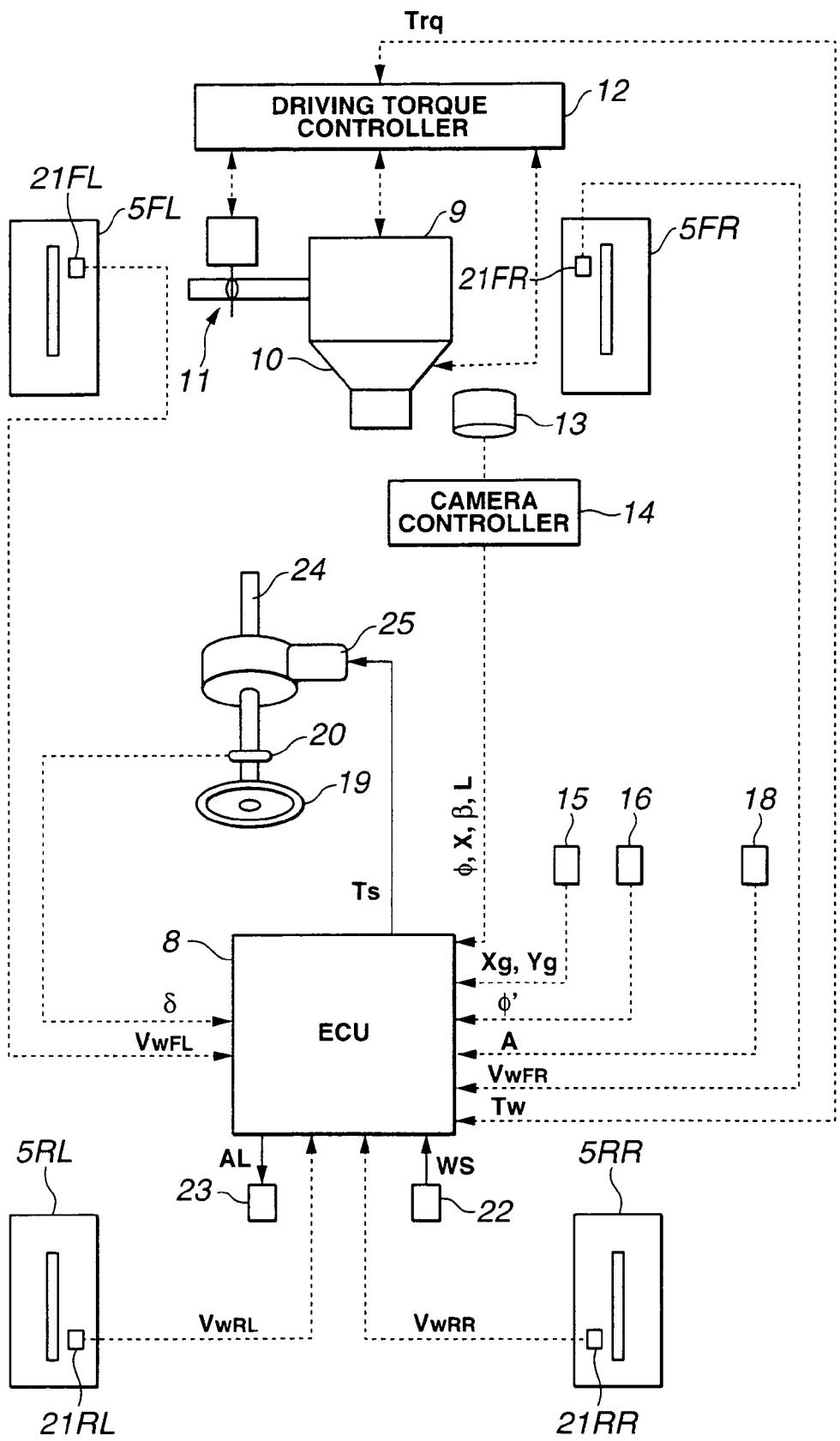
FIG. 10 is a system block diagram illustrating a second embodiment of an automotive lane deviation avoidance system.
Figure 11:
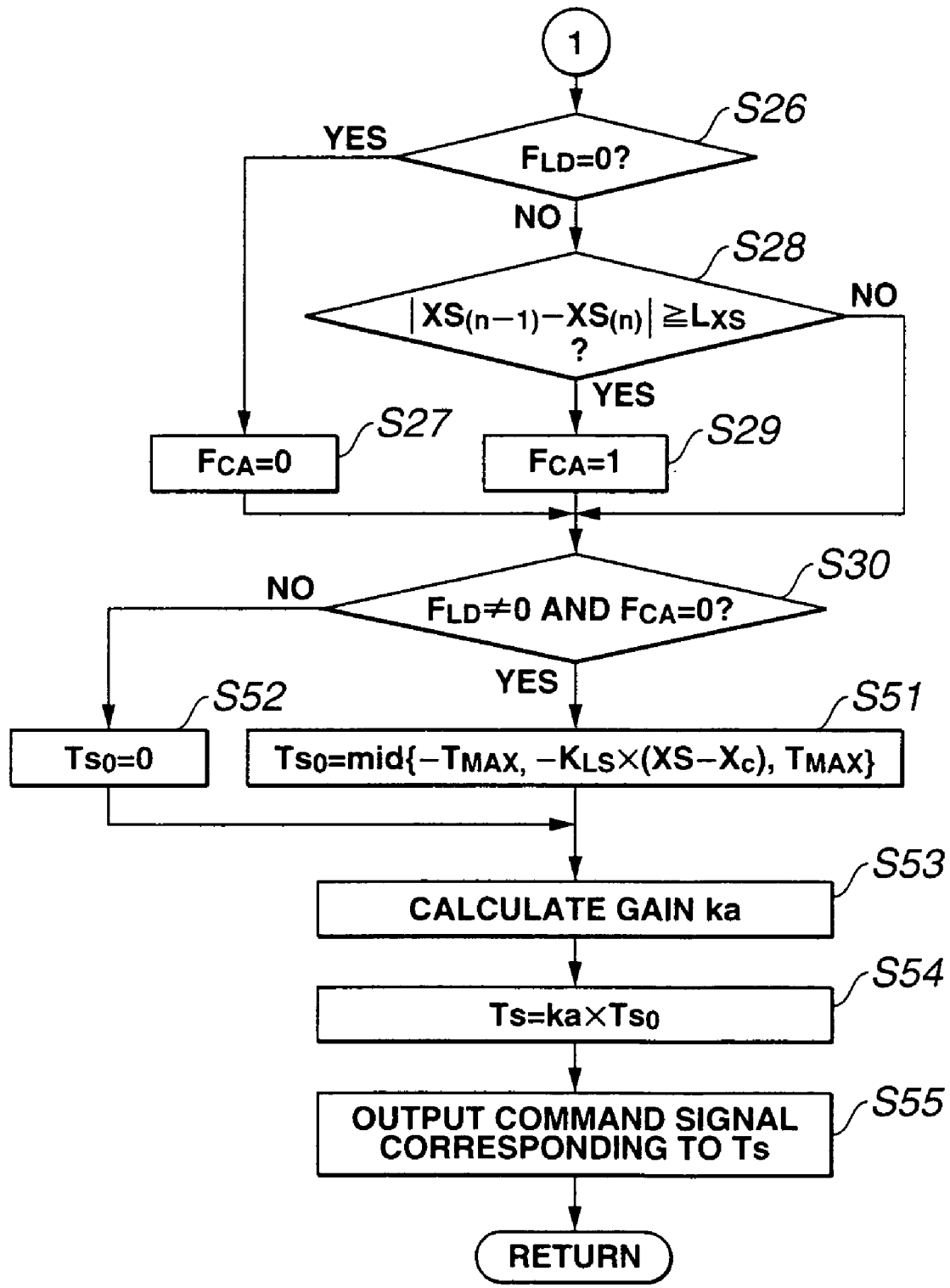
FIG. 11 is a flow chart showing the second half of a lane deviation avoidance control routine executed by the system of the second embodiment of FIG. 10.

Referring now to FIGS. 10 and 11, there is shown the lane deviation avoidance system of the second embodiment. FIG. 10 shows the system block diagram of the system of the second embodiment, whereas FIG. 11 shows the second half of the lane deviation avoidance control routine executed by the system of the second embodiment. Note that the routine shown in FIG. 2 also serves as the first half of the lane deviation avoidance control routine executed by the system of the second embodiment. The system of the second embodiment of FIGS. 10, 2, and 11 is different from the system of the first embodiment of FIGS. 1–3, in that in the system of the second embodiment the host vehicle's course correction to the lane-deviation avoidance direction is made by means of a steering control system that applies a steering torque acting in the lane-deviation avoidance direction to a steering system. Concretely, as shown in FIG. 10, instead of using hydraulic modulator 7 included in the system of the first embodiment of FIGS. 1–3, a steering actuator 25 that applies a steering torque to a steering shaft 24, is used. As discussed above, the construction of the system of the second embodiment is similar to that of the first embodiment, except that the host vehicle's course correction to the lane-deviation avoidance direction is made by means of the steering control system including steering actuator 25 instead of using the braking-force/driving-force control system including at least hydraulic modulator 7. Thus, for the purpose of comparison of the first and second embodiments, the same reference signs used to designate elements shown in the first embodiment will be applied to the corresponding elements used in the second embodiment. As can be appreciated from comparison between the flow charts shown in FIG. 3 (the first embodiment) and 11 (the second embodiment), the routine of FIG. 3 is different from that of FIG. 11, in that steps S31–S46 shown in FIG. 3 are replaced with steps S51–S55 shown in FIG. 11. Thus, the same step numbers used to designate steps in the routine shown in FIG. 3 will be applied to the corresponding step numbers used in the modified routine shown in FIG. 11. Steps S51–S55 will be hereinafter described in detail with reference to the accompanying drawings, while detailed description of steps S26–S30 will be omitted because the above description thereon seems to be self-explanatory.

In the routine shown in FIG. 11, when the answer to step S30 is in the affirmative ($F_{LD} \neq 0$ and $F_{CA}=0$), the routine proceeds from step S30 via step S51 to step S53.

At step S51, a desired applied steering torque (simply, a desired steering torque $Ts_0$) is arithmetically calculated based on lane-deviation estimate XS and predetermined lane-deviation criterion $X_C$, from the following expression (21).

$$Ts_0 = \text{mid}\{-T_{MAX}, -K_{LS} \times (XS-X_C), T_{MAX}\} \quad (21)$$

where $T_{MAX}$ denotes an upper limit of steering torque applied from steering actuator 25 to steering shaft 24, $-T_{MAX}$ denotes a lower limit of steering torque applied, and $K_{LS}$ denotes a constant that is determined by specifications of the host vehicle. The function $Ts_0=\text{mid}\{-T_{MAX}, -K_{LS} \times (XS-X_C), T_{MAX}\}$ represents a so-called select-MID process according to which a median value of three values, namely, $-T_{MAX}$, $-K_{LS} \times (XS-X_C)$, and $T_{MAX}$ is selected as desired steering torque $Ts_0$.

On the contrary, when the answer to step S30 is in the negative ($F_{LD}=0$ or $F_{CA}=1$), the routine proceeds from step S30 via step S52 to step S53.

At step S52, desired steering torque $Ts_0$ is set to "0".

At step S53, accelerator sensitive gain (or throttle sensitive gain) ka is calculated or retrieved based on throttle opening A from the predetermined A-ka characteristic map of FIG. 5. After step S53, step S54 occurs.

At step S54, a final desired steering torque Ts is arithmetically calculated based on desired steering torque $Ts_0$ calculated through step S51 and accelerator sensitive gain ka calculated through step S53, from the following expression (22).

$$Ts = ka \times Ts_0 \quad (22)$$

Thereafter, step S55 occurs.

At step S55, a command signal corresponding to final desired steering torque Ts is output from the input interface of ECU 8 to steering actuator 25. In this manner, one cycle of the time-triggered interrupt routine (the lane deviation avoidance control routine executed by the system of the second embodiment shown in FIGS. 2 and 10–11) terminates and the predetermined main program is returned.

In the system of the second embodiment described previously, throttle opening sensor 18 of FIG. 10 serves as a throttle opening detection section (throttle opening detection means). In the lane deviation avoidance control routine shown in FIGS. 2 and 11, steps S3–S13 and S19–S25 serve as a lane-deviation decision section (lane-deviation decision means). Steps S30 and S51–S52 serve as a host vehicle's course correction value calculation section (host vehicle's course correction value calculation means). Steps S53–S54 serve as a host vehicle's course correction value compensation section (host vehicle's course correction value compensation means). Step S55 and steering actuator 25 of the steering control system of FIG. 10 serve as a host vehicle's course correction section (host vehicle's course correction means). Desired steering torque $Ts_0$ corresponds to a host vehicle's course correction value. Steps S26–S30, and S51–S55 of FIG. 11 and steering actuator 25 of the steering control system of FIG. 10 serve as a lane-deviation avoidance section (lane-deviation avoidance means).

The system of the second embodiment operates as follows. When the host vehicle begins to gradually deviate from the central axis of the current driving lane without turning direction indicator switch 22 on and thus the absolute value |XS| of lane-deviation estimate XS becomes greater than or equal to predetermined alarm criterion $X_W$, warning system 23 warns the driver of the increased tendency of lane deviation from the current host vehicle's driving lane (see step S15 of FIG. 2). Thereafter, as soon as the absolute value |XS| of lane-deviation estimate XS becomes greater than or equal to predetermined lane-deviation criterion $X_C$ and thus the condition defined by $F_{LD} \neq 0$ (that is, $F_{LD}=1$ or $F_{LD}=-1$) becomes satisfied (see steps S20 or S22 of FIG. 2), desired steering torque $Ts_0$, applied via steering actuator 25 to steering shaft 24 of the host vehicle and acting in a direction that the lane deviation is avoided, is calculated from the previously-discussed expression (21) (see step S51 of FIG. 11). Thereafter, the throttle-opening A dependent accelerator sensitive gain ka is calculated or map-retrieved (see step S53), and desired steering torque $Ts_0$ is compensated for based on accelerator sensitive gain ka in accordance with the expression (22), that is, $Ts=ka \times Ts_0$ (see step S54). Then, in order to produce final desired yawing moment Ms compensated for, the command signal corresponding to final desired steering torque Ts is output from ECU 8 to steering actuator 25, and whereby it is possible to more precisely correct the host vehicle's course in the direction that the lane deviation is avoided, to match to the driver's wishes.

As described previously, according to the system of the second embodiment shown in FIGS. 2 and 10–11, in correcting the host vehicle's course in the direction that the lane deviation is avoided by applying the steering torque to the steering system, it is possible to avoid the lane deviation without decelerating the host-vehicle. In case of an electronically-controlled steering system equipped vehicle, the electronically-controlled steering system itself can be used as the lane deviation avoidance system of the second embodiment. That is, the electronically-controlled steering system itself is capable of functioning to produce a yawing moment acting in the direction that the lane deviation is avoided, in the same manner as the first and second embodiments.

The entire contents of Japanese Patent Application No. 2002-336634 (filed Nov. 20, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation avoidance system comprising:
   a control unit that executes a host vehicle's lane deviation control that a change in vehicle dynamic behavior occurs in a direction that avoids a host vehicle from deviating from a driving lane when there is an increased tendency of the host vehicle's lane deviation from the driving lane; and
   the control unit comprising:
   (i) a lane-deviation decision section that determines the presence or absence of the increased tendency of the host vehicle's lane deviation from the driving lane; and
   (ii) a lane-deviation avoidance section that prevents the host vehicle from deviating from the driving lane by correcting the host vehicle's course in the direction that avoids the host vehicle's lane deviation in the presence of the increased tendency of the host vehicle's lane deviation from the driving lane, the lane-deviation avoidance section calculating a host vehicle's course correction value needed to avoid the host vehicle's lane deviation from the driving lane and additionally compensating for the host vehicle's course correction value based on a throttle opening of the host vehicle.

2. An automotive lane deviation avoidance system comprising:
   a control unit that executes a host vehicle's lane deviation control that a change in vehicle dynamic behavior occurs in a direction that avoids a host vehicle from deviating from a driving lane when there is an increased tendency of the host vehicle's lane deviation from the driving lane; and
   the control unit comprising:
   (i) a lane-deviation decision section that determines the presence or absence of the increased tendency of the host vehicle's lane deviation from the driving lane;
   (ii) a lane-deviation avoidance section that prevents the host vehicle from deviating from the driving lane by correcting the host vehicle's course in the direction that avoids the host vehicle's lane deviation in the presence of the increased tendency of the host vehicle's lane deviation from the driving lane; and
   (iii) a throttle opening detection section that detects a throttle opening;
   the lane-deviation avoidance section comprising:
   (a) a host vehicle's course correction value calculation section that calculates a host vehicle's course correction value needed to avoid the host vehicle's lane deviation from the driving lane;
   (b) a host vehicle's course correction value compensation section that compensates for the host vehicle's course correction value based on the throttle opening; and
   (c) a host vehicle's course correction section that corrects the host vehicle's course in the direction that avoids the host vehicle's lane deviation, depending on the host vehicle's course correction value compensated for based on the throttle opening.

3. The automotive lane deviation avoidance system as claimed in claim 2, wherein:
   the host vehicle's course correction value compensation section starts to compensate for the host vehicle's course correction value based on the throttle opening when the throttle opening exceeds a predetermined value, and decreasingly compensates for the host vehicle's course correction value so that the host vehicle's course correction value decreases as the throttle opening increases from the predetermined value.

4. The automotive lane deviation avoidance system as claimed in claim 3, which further comprising:
   an adaptive cruise control system that a host vehicle speed is controlled depending on an inter-vehicle distance between the host vehicle and a preceding vehicle;
   wherein, when compensating for the host vehicle's course correction value based on the throttle opening, the host vehicle's course correction value compensation section compensates for the host vehicle's course correction value, so that a correction factor suited for an operative state of the adaptive cruise control system is higher than a correction factor suited for an inoperative state of the adaptive cruise control system for the same throttle opening.

5. The automotive lane deviation avoidance system as claimed in claim 4, wherein:
   the host vehicle's course correction value compensation section compensates for the host vehicle's course correction value, so that the predetermined value at which compensation for the host vehicle's course correction value is started during the operative state of the adaptive cruise control system, is set to be higher than the predetermined value at which compensation for the host vehicle's course correction value is started during the inoperative state of the adaptive cruise control system.

6. The automotive lane deviation avoidance system as claimed in claim 1, wherein:
   the lane-deviation decision section estimates an estimate of a future lateral deviation of the host vehicle from a central axis of the driving lane based on at least a host vehicle speed, a host vehicle's yaw angle with respect to a direction of the driving lane, a lateral deviation from the central axis of the driving lane, and a curvature of the driving lane; and the lane-deviation decision section determines the presence of the increased tendency of the host vehicle's lane deviation from the driving lane, when the estimate of the future lateral deviation of the host vehicle is greater than or equal to a predetermined lane-deviation criterion.

7. The automotive lane deviation avoidance system as claimed in claim 2, wherein:

the host vehicle's course correction value calculation section calculates the host vehicle's course correction value based on a deviation between an estimate of a future lateral deviation of the host vehicle from a central axis of the driving lane, which estimate is calculated based on at least a host vehicle speed, a host vehicle's yaw angle with respect to a direction of the driving lane, a lateral deviation from the central axis of the driving lane, and a curvature of the driving lane, and a predetermined lane-deviation criterion.

8. The automotive lane deviation avoidance system as claimed in claim 2, wherein:

the host vehicle's course correction section comprises a braking-force and driving-force control system that produces a yawing moment, acting in the direction that avoids the host vehicle from deviating from the driving lane, by controlling at least one of a braking force and a driving force applied to each of road wheels of the host vehicle.

9. The automotive lane deviation avoidance system as claimed in claim 8, wherein:

the braking-force and driving-force control system automatically arbitrarily controls braking forces applied to the respective road wheels irrespective of a driver's braking action.

10. The automotive lane deviation avoidance system as claimed in claim 2, wherein:

the host vehicle's course correction section comprises a steering control system that applies a steering torque, acting in the direction that avoids the host vehicle from deviating from the driving lane, to a steering system.

11. An automotive lane deviation avoidance system comprising:

a control unit that executes a host vehicle's lane deviation control that a change in vehicle dynamic behavior occurs in a direction that avoids the host vehicle from deviating from a driving lane when there is an increased tendency of the host vehicle's lane deviation from the driving lane; and the control unit comprising:
 (i) a lane-deviation decision means for determining the presence or absence of the possibility of the host vehicle's lane deviation from the driving lane; and
 (ii) a lane-deviation avoidance means for preventing the host vehicle from deviating from the driving lane by correcting the host vehicle's course in the direction that avoids the host vehicle's lane deviation in the presence of the increased tendency of the host vehicle's lane deviation from the driving lane, and for calculating a host vehicle's course correction value needed to avoid the host vehicle's lane deviation from the driving lane, and for compensating for the host vehicle's course correction value based on a throttle opening of the host vehicle.

12. An automotive lane deviation avoidance system comprising:

a control unit that executes a host vehicle's lane deviation control that a change in vehicle dynamic behavior occurs in a direction that avoids the host vehicle from deviating from a driving lane when there is an increased tendency of the host vehicle's lane deviation from the driving lane; and the control unit comprising:
 (i) a lane-deviation decision means for determining the presence or absence of the increased tendency of the host vehicle's lane deviation from the driving lane;
 (ii) a lane-deviation avoidance means for preventing the host vehicle from deviating from the driving lane by correcting the host vehicle's course in the direction that avoids the host vehicle's lane deviation in the presence of the increased tendency of the host vehicle's lane deviation from the driving lane; and
 (iii) a throttle opening detection means for detecting a throttle opening;

the lane-deviation avoidance means comprising:
 (a) a host vehicle's course correction value calculation means for calculating a host vehicle's course correction value needed to avoid the host vehicle's lane deviation from the driving lane;
 (b) a host vehicle's course correction value compensation means for compensating for the host vehicle's course correction value based on the throttle opening; and
 (c) a host vehicle's course correction means for correcting the host vehicle's course in the direction that avoids the host vehicle's lane deviation, depending on the host vehicle's course correction value compensated for based on the throttle opening.

13. A method of avoiding an adaptive cruise control system equipped vehicle from deviating from a driving lane, the method comprising:

determining the presence or absence of a driver's intention for lane changing;

determining the presence or absence of an increased tendency of a host vehicle's lane deviation from a driving lane without the driver's intention for lane changing;

calculating a host vehicle's course correction value needed to avoid the host vehicle's lane deviation from the driving lane;

compensating for the host vehicle's course correction value based on a throttle opening of the host vehicle; and avoiding the host vehicle's lane deviation from the driving lane by correcting the host vehicle's course by the host vehicle's course correction value compensated for based on the throttle opening in the presence of the increased tendency of the host vehicle's lane deviation from the driving lane without the driver's intention for lane changing.

14. The method as claimed in claim 13, wherein:

the host vehicle's course correction value is compensated for by a throttle-opening dependent gain, the gain remaining fixed to a predetermined constant value until a predetermined throttle opening is reached, and decreasing as the throttle opening increases from the predetermined throttle opening.

15. The method as claimed in claim 14, wherein:

a rate of decrease in the gain with respect to the throttle opening decreases as a host vehicle speed increases.

16. The method as claimed in claim 14, wherein:

the gain suited for an operative state of the adaptive cruise control system is set to be higher than the gain suited for an inoperative state of the adaptive cruise control system for the same throttle opening.

17. The method as claimed in claim 14, wherein:
the predetermined throttle opening at which compensation for the host vehicle's course correction value is started during the operative state of the adaptive cruise control system, is set to be higher than the predetermined throttle opening at which compensation for the host vehicle's course correction value is started during the inoperative state of the adaptive cruise control system.

18. A method of avoiding an adaptive cruise control system equipped vehicle from deviating from a driving lane, the adaptive cruise control system equipped vehicle employing a braking-force and driving-force control system that produces a yawing moment, acting in a direction that avoids a host vehicle from deviating from the driving lane when there is an increased tendency of the host vehicle's lane deviation from the driving lane, by controlling at least one of a braking force and a driving force applied to each of road wheels of the host vehicle, the method comprising:
determining the presence or absence of a driver's intention for lane changing;
determining the presence or absence of the increased tendency of the host vehicle's lane deviation from the driving lane without the driver's intention for lane changing;
calculating a desired yawing moment needed to avoid the host vehicle's lane deviation from the driving lane;
compensating for the desired yawing moment based on a throttle opening of the host vehicle to derive a final desired yawing moment decreasingly compensated for by a throttle-opening dependent gain; and
avoiding the host vehicle's lane deviation from the driving lane by correcting the host vehicle's course by the final desired yawing moment in the presence of the increased tendency of the host vehicle's lane deviation from the driving lane without the driver's intention for lane changing.

19. A method of avoiding an adaptive cruise control system equipped vehicle from deviating from a driving lane, the adaptive cruise control system equipped vehicle employing a steering control system that produces a steering torque, acting in a direction that avoids a host vehicle from deviating from the driving lane when there is an increased tendency of the host vehicle's lane deviation from the driving lane, by controlling the steering torque applied to a steering system, the method comprising:
determining the presence or absence of a driver's intention for lane changing;
determining the presence or absence of the increased tendency of the host vehicle's lane deviation from the driving lane without the driver's intention for lane changing;
calculating a desired steering torque needed to avoid the host vehicle's lane deviation from the driving lane;
compensating for the desired steering torque based on a throttle opening of the host vehicle to derive a final desired steering torque decreasingly compensated for by a throttle-opening dependent gain; and
avoiding the host vehicle's lane deviation from the driving lane by correcting the host vehicle's course by the final desired steering torque in the presence of the increased tendency of the host vehicle's lane deviation from the driving lane without the driver's intention for lane changing.

20. An automotive lane deviation avoidance system comprising:
a control unit that executes a host vehicle's lane deviation control that a change in vehicle dynamic behavior occurs in a direction that avoids a host vehicle from deviating from a driving lane when a lateral deviation of the host vehicle from a central axis of the driving lane exceeds a predetermined threshold value; and
the control unit comprising:
(i) a lane-deviation decision section that determines whether the host vehicle's lateral deviation from the central axis of the driving lane exceeds the predetermined threshold value;
(ii) a lane-deviation avoidance section that prevents the host vehicle from deviating from the driving lane by correcting the host vehicle's course in the direction that avoids the host vehicle's lane deviation when the host vehicle's lateral deviation from the central axis of the driving lane exceeds the predetermined threshold value; and
(iii) a throttle opening detection section that detects a throttle opening;
the lane-deviation avoidance section comprising:
(a) a host vehicle's course correction value calculation section that calculates a host vehicle's course correction value needed to avoid the host vehicle's lane deviation from the driving lane;
(b) a host vehicle's course correction value compensation section that compensates for the host vehicle's course correction value based on the throttle opening; and
(c) a host vehicle's course correction section that corrects the host vehicle's course in the direction that avoids the host vehicle's lane deviation, depending on the host vehicle's course correction value compensated for based on the throttle opening.

21. An automotive vehicle employing a lane deviation avoidance (LDA) system comprising:
a control unit that executes a host vehicle's lane deviation control that a change in vehicle dynamic behavior occurs in a direction that avoids a host vehicle from deviating from a driving lane when a lateral deviation of the host vehicle from a central axis at the driving lane exceeds a predetermined threshold value; and
the control unit comprising:
(i) a lane-deviation decision section that determines whether the host vehicle's lateral deviation from the central axis of the driving lane exceeds the predetermined threshold value;
(ii) an LDA section that prevents the host vehicle from deviating from the driving lane by correcting the host vehicle's course in the direction that avoids the host vehicle's lane deviation when the host vehicle's lateral deviation from the central axis of the driving lane exceeds the predetermined threshold value; and
(iii) a throttle opening detection section that detects a throttle opening;
the LDA section comprising:
(a) a host vehicle's course correction value calculation section that calculates a host vehicle's course correction value needed to avoid the host vehicle's lane deviation from the driving lane;
(b) a host vehicle's course correction value compensation section that compensates for the host vehicle's course correction value based on the throttle opening; and
(c) a host vehicle's course correction section that corrects the host vehicle's course in the direction that avoids the host vehicle's lane deviation, depending on the host vehicle's course correction value compensated for based on the throttle opening.

22. The automotive lane deviation avoidance system as claimed in claim 1, wherein the control unit further comprises:
a lane-deviation estimation section that estimates a lane deviation for the vehicle,
wherein the control unit determines that there is the increased tendency of the host vehicle's lane deviation from the driving lane when the estimated lane deviation determined by the lane-deviation estimation section is greater than a predetermined lane deviation amount.

* * * * *